(12) United States Patent
Mitsutsuji et al.

(10) Patent No.: US 10,583,591 B2
(45) Date of Patent: Mar. 10, 2020

(54) FIBER-REINFORCED THERMOPLASTIC RESIN MOLDED ARTICLE AND FIBER-REINFORCED THERMOPLASTIC RESIN MOLDING MATERIAL

(71) Applicant: Toray Industries, Inc., Tokyo (JP)

(72) Inventors: Yuki Mitsutsuji, Nagoya (JP); Sora Bang, Nagoya (JP); Shin Hirata, Nagoya (JP); Atsuki Tsuchiya, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 291 days.

(21) Appl. No.: 15/519,383

(22) PCT Filed: Oct. 20, 2015

(86) PCT No.: PCT/JP2015/079528
§ 371 (c)(1),
(2) Date: Apr. 14, 2017

(87) PCT Pub. No.: WO2016/063855
PCT Pub. Date: Apr. 28, 2016

(65) Prior Publication Data
US 2017/0225373 A1  Aug. 10, 2017

(30) Foreign Application Priority Data

Oct. 21, 2014 (JP) ................................. 2014-214228
Dec. 8, 2014 (JP) ................................. 2014-247560

(51) Int. Cl.
| | |
|---|---|
| *B29C 45/00* | (2006.01) |
| *C08J 5/04* | (2006.01) |
| *C08K 3/04* | (2006.01) |
| *C08K 7/06* | (2006.01) |
| *C08L 101/00* | (2006.01) |
| *C08L 45/00* | (2006.01) |
| *C08L 63/00* | (2006.01) |
| *C08L 61/04* | (2006.01) |
| *C08L 81/04* | (2006.01) |
| *C08J 5/06* | (2006.01) |
| *C08L 69/00* | (2006.01) |
| *C08J 5/10* | (2006.01) |
| *C01B 32/05* | (2017.01) |
| *B29C 70/16* | (2006.01) |
| *C08K 3/22* | (2006.01) |
| *B29K 307/04* | (2006.01) |

(52) U.S. Cl.
CPC .......... *B29C 45/0005* (2013.01); *B29C 70/16* (2013.01); *C01B 32/05* (2017.08); *C08J 5/04* (2013.01); *C08J 5/042* (2013.01); *C08J 5/06* (2013.01); *C08J 5/10* (2013.01); *C08K 3/04* (2013.01); *C08K 3/22* (2013.01); *C08K 7/06* (2013.01); *C08L 45/00* (2013.01); *C08L 61/04* (2013.01); *C08L 63/00* (2013.01); *C08L 69/00* (2013.01); *C08L 81/04* (2013.01); *C08L 101/00* (2013.01); *B29C 2045/0006* (2013.01); *B29K 2307/04* (2013.01); *C08J 2369/00* (2013.01); *C08J 2381/04* (2013.01); *C08K 2201/003* (2013.01)

(58) Field of Classification Search
CPC ................ B29C 45/0005; B29C 70/16; B29C 2045/0006; C01B 32/05; C08L 69/00; C08L 101/00; C08L 81/04; C08L 63/00; C08L 45/00; C08L 61/04; C08J 5/06; C08J 5/042; C08J 5/10; C08J 5/04; C08J 2381/04; C08J 2639/00; C08K 3/22; C08K 7/06; C08K 3/04; C08K 2201/003; B29K 2307/04
See application file for complete search history.

(56) References Cited

U.S. PATENT DOCUMENTS

| | | | | |
|---|---|---|---|---|
| 2011/0260096 | A1* | 10/2011 | Atarashi | ................ C08J 9/0061 252/73 |
| 2012/0238674 | A1* | 9/2012 | Atarashi | ............. C08L 23/0815 524/56 |
| 2012/0322935 | A1 | 12/2012 | Atarashi | |
| 2016/0244588 | A1 | 8/2016 | Kotaka et al. | |

FOREIGN PATENT DOCUMENTS

| | | | | |
|---|---|---|---|---|
| JP | 08-142217 | A | 6/1996 | |
| JP | 10-237316 | A | 9/1998 | |
| JP | 11-179830 | A | 7/1999 | |
| JP | 2001-131426 | A | 5/2001 | |
| JP | 2002-118371 | A | 4/2002 | |
| JP | 2007002231 | A * | 1/2007 | ............... C08K 3/04 |

(Continued)

OTHER PUBLICATIONS

Supplementary European Search Report dated Jun. 14, 2018, of corresponding European Application No. 15852029.6.

*Primary Examiner* — Robert S Jones
(74) *Attorney, Agent, or Firm* — DLA Piper LLP (US)

(57) ABSTRACT

A fiber reinforced thermoplastic resin molded article includes (A) carbon fibers, (B) graphite and (C) a thermoplastic resin, wherein the carbon fibers (A), the graphite (B) and the thermoplastic resin (C) are contained in amounts of 1 to 30 parts by weight, 1 to 40 parts by weight and 30 to 98 parts by weight, respectively, relative to 100 parts by weight, of the carbon fibers (A), the graphite (B) and the thermoplastic resin (C), the weight average fiber length of the carbon fibers (A) is 0.3 to 3 mm and the specific gravity of the molded article is 1.1 to 1.9 g/cm³. The fiber reinforced thermoplastic resin molded article has excellent bending strength and heat conductivity.

5 Claims, 3 Drawing Sheets

(56) References Cited

FOREIGN PATENT DOCUMENTS

| JP | 2012-056232 A | 3/2012 |
| JP | 2012-149143 A | 8/2012 |
| JP | 2014-051587 A | 3/2014 |
| JP | 2014-159559 A | 9/2014 |
| JP | 2014-177547 A | 9/2014 |
| WO | 2015/046630 | 4/2015 |

\* cited by examiner

FIBER-REINFORCED THERMOPLASTIC RESIN MOLDED ARTICLE AND FIBER-REINFORCED THERMOPLASTIC RESIN MOLDING MATERIAL

TECHNICAL FIELD

This disclosure relates to: a fiber reinforced thermoplastic resin molded article comprising carbon fibers, graphite and a thermoplastic resin; and a fiber reinforced thermoplastic resin molding material.

BACKGROUND

Molded articles each comprising reinforcing fibers and a thermoplastic resin are lightweight and have excellent mechanical properties and, therefore, have been used widely in applications including applications to sporting goods, aerospace applications and general industrial applications. In the molded articles, the reinforcing fibers used are metal fibers such as aluminum fibers and stainless steel fibers, organic fibers such as aramid fibers and PBO (polyparaphenylene benzoxazole) fibers, inorganic fibers such as silicon carbide fibers, carbon fibers and the like. Among these reinforcing fibers, from the viewpoint of the balance among specific strength, specific stiffness and lightweight properties, carbon fibers are preferred, and polyacrylonitrile (PAN)-type carbon fibers have been particularly preferably used.

Because of the excellent specific strength and specific stiffness of carbon fibers, molded articles reinforced with carbon fibers have excellent lightweight properties and bending strength. Therefore, the molded articles have been used widely in various fields including housings for electronic devices and automotive members. However, in applications for electronic device housings, the amount of heat generated in each of the electronic components tends to increase due to the improved performance of the electronic components. In those situations, in molded articles such as housings, it has been demanded to improve heat conductivity as well as lightweight properties and bending strength.

For example, as a molding material having excellent fiber dispersibility, a molding material in which a thermoplastic resin is adhered to composite reinforcing fiber filaments (see, e.g., Japanese Patent Laid-open Publication No. 2012-56232) is proposed. As an electrically conductive resin composition having excellent heat resistance, stiffness and dimensional accuracy, an electrically conductive resin composition composed of a thermoplastic resin, carbon fibers and graphite having a scaly form (see, e.g., Japanese Patent Laid-open Publication No. 10-237316) is proposed. As a heat-conductive polycarbonate resin composition having excellent impact resistance, heat conductivity and flame retardancy, a heat-conductive polycarbonate resin composition composed of a polycarbonate resin, carbon fibers and phosphorus-containing flame retardant agent (see, e.g., Japanese Patent Laid-open Publication No. 2014-177547) and the like are proposed.

However, in the techniques disclosed in JP '232, JP '316 and JP '547, there is the problem of insufficiency in bending strength and heat conductivity. It could therefore be helpful to provide a fiber reinforced thermoplastic resin molded article having excellent bending strength and heat conductivity.

SUMMARY

We thus provide:

A fiber reinforced thermoplastic resin molded article comprising (A) carbon fibers, (B) graphite and (C) a thermoplastic resin, wherein the carbon fibers (A), the graphite (B) and the thermoplastic resin (C) are contained in amounts of 1 to 30 parts by weight, 1 to 40 parts by weight and 30 to 98 parts by weight, respectively, relative to the total amount, i.e., 100 parts by weight, of the carbon fibers (A), the graphite (B) and the thermoplastic resin (C), the weight average fiber length of the carbon fibers (A) is 0.3 to 3 mm and the specific gravity of the molded article is 1.1 to 1.9 $g/cm^3$.

A fiber reinforced thermoplastic resin molding material comprising (A) carbon fibers, (B) graphite, (C) a thermoplastic resin, and a component (D) selected from an epoxy resin, a phenolic resin, a terpene resin and a cyclic polyarylene sulfide, wherein the carbon fibers (A), the graphite (B), the thermoplastic resin (C) and the component (D) are contained in amounts of 1 to 30 parts by weight, 1 to 40 parts by weight, 30 to 98 parts by weight and 0.1 to 15 parts by weight, respectively, relative to the total amount, i.e., 100 parts by weight, of the carbon fibers (A), the graphite (B) and the thermoplastic resin (C), and (E) a composite fiber filament comprising the carbon fibers (A) with the component (D) is covered with a composition comprising the graphite (B) and the thermoplastic resin (C).

The fiber reinforced thermoplastic resin molded article has long carbon fiber lengths and excellent bending properties and heat conductivity. The fiber reinforced thermoplastic resin molded article is extremely useful as various components/members such as components, internal members and housings for electric/electronic devices, OA devices, household electrical appliances and automobiles.

DESCRIPTION OF REFERENCE SIGNS

Figure 1:
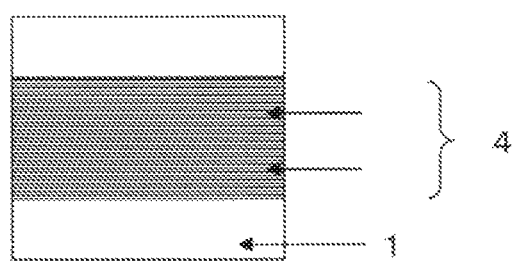
FIG. 1 shows a schematic illustration of one preferred example of the vertical cross section of the molding material.

1: Thermoplastic resin (C)
2 (black part): Carbon fiber (A)
3 (white part): Component (D)
4: Composite fiber filament (E)
5: Plane direction of molded article
6: Thickness direction of molded article
7: Surface of molded article
8: Skin layer of molded article
9: Core layer of molded article

DETAILED DESCRIPTION

The fiber reinforced thermoplastic resin molded article (sometimes simply referred to as "the molded article," hereinafter) contains at least (A) carbon fibers, (B) graphite and (C) a thermoplastic resin.

The carbon fibers (A) have excellent specific strength, and therefore contribute to the bending strength of a molded article. The carbon fibers (A) also have electrical conductivity, and therefore can improve an electromagnetic wave shielding property. In addition, the carbon fibers (A) have higher heat conductivity compared with that of the thermoplastic resin (C), and, therefore, enable the easier formation of heat conduction paths when used in combination of the below-mentioned graphite (B) and can greatly improve heat conductivity. The carbon fibers (A) to be used are not particularly limited, and are preferably carbon fibers such as PAN-based carbon fibers, Pitch-based carbon fibers and rayon-based carbon fibers. From the viewpoint of the further improvement in bending strength and heat conductivity of the resultant molded article, PAN-based carbon fibers are more preferred.

In addition, it is preferred that the carbon fibers (A) have a surface oxygen concentration ratio [O/C], which is a ratio of the number of atoms of oxygen (O) to the number of atoms of carbon (C) in the surfaces of the fibers as measured by X-ray photoelectron spectroscopy, of 0.05 to 0.5. When the surface oxygen concentration ratio is 0.05 or more, a sufficient amount of a functional group can be provided in the surfaces of the carbon fibers and the stronger adhesion between the carbon fibers (A) and the thermoplastic resin (C) can be achieved, resulting in the further improvement in bending strength of the molded article. The surface oxygen concentration ratio is more preferably 0.08 or more, still more preferably 0.1 or more. On the other hand, the upper limit of the surface oxygen concentration ratio is not particularly limited. From the viewpoint of the balance between the easiness of handling of the carbon fibers and productivity, the upper limit is generally preferably 0.5 or less, more preferably 0.4 or less, still more preferably 0.3 or less.

The oxygen concentration ratio in the surfaces of the carbon fibers can be determined by X-ray photoelectron spectroscopy in the following manner. First, when a sizing agent or the like is adhered onto the surfaces of the carbon fibers, the sizing agent or the like adhered onto the surfaces of the carbon fibers is removed with a solvent. A carbon fiber filament is cut into pieces each having a length of 20 mm, and the pieces are spread and arranged on a copper-made sample support table. Subsequently, the inside of a sample chamber is kept at $1 \times 10^{-8}$ Torr using AlK$\alpha$1 or AlK$\alpha$2 as an X-ray source. As a value for the correction of a peak which should be carried out due to the occurrence of electrostatic charging during the measurement, the kinetic energy value (K.E.) of the main peak of $C_{1s}$ is set at 1202 eV. The $C_{1s}$ peak area is determined by drawing, as K.E., a linear base line in the range from 1191 to 1205 eV. The $O_{1s}$ peak area is determined by drawing, as K.E., a liner base line in the range from 947 to 959 eV.

The surface oxygen concentration [O/C] can be calculated as an atom number ratio from the ratio of the $O_{1s}$ peak area to the $C_{1s}$ peak area using a sensitivity correction value inherent to a device. When ES-200 model (manufactured by Kokusai Electric Inc.) is used as the X-ray photoelectron spectroscopy device, the sensitivity correction value is 1.74.

The means for adjusting the surface oxygen concentration ratio [O/C] to 0.05 to 0.5 is not particularly limited. Examples of the means include an electrolytic oxidation treatment, a chemical solution oxidation treatment and a gas-phase oxidation treatment. Among these means, an electrolytic oxidation treatment is preferred.

The average fiber diameter of the carbon fibers (A) is not particularly limited, and is preferably 1 to 20 μm, more preferably 3 to 15 μm, from the viewpoint of the mechanical properties and surface appearance of the molded article.

The number of single fibers constituting the carbon fiber filament is not particularly limited, and is preferably 100 to 350,000 and is more preferably 20,000 to 100,000 from the viewpoint of productivity.

For the purpose of improving adhesion between the carbon fibers (A) and the thermoplastic resin (C) or other purposes, the surfaces of the carbon fibers (A) may be treated. As the technique for treating the surfaces, an electrolytic treatment, an ozone treatment, an ultraviolet ray treatment and the like can be mentioned.

For the purpose of preventing the fluffing of the carbon fibers (A), improving the adhesion between the carbon fibers and the thermoplastic resin (C) or other purposes, a sizing agent may be applied to the carbon fibers (A). When a sizing agent is applied, the surface properties of the carbon fibers such as a functional group on the surfaces of the carbon fibers, can be improved and the adhesion and composite comprehensive properties can also be improved.

Examples of the sizing agent include an epoxy resin, a phenolic resin, polyethylene glycol, polyurethane, polyester, an emulsifying agent and a surfactant. Two or more of these sizing agents may be used in combination. The sizing agent is preferably water-soluble or water-dispersible. An epoxy resin which has excellent wettability against carbon fibers is preferred, and a polyfunctional epoxy resin is more preferred.

Examples of the polyfunctional epoxy resin include a bisphenol A-type epoxy resin, a bisphenol F-type epoxy resin, an aliphatic epoxy resin and a phenol novolak-type epoxy resin. Among these epoxy resins, an aliphatic epoxy resin which can be adhered to the thermoplastic resin (C) easily is preferred. An aliphatic epoxy resin has a soft structure, and therefore tends to form a highly tough structure even when the crosslinking density is high. An aliphatic epoxy resin can make the resultant molded article flexible and hardly peelable when interposed between the carbon fibers and the thermoplastic resin, and therefore can further improve the strength of the resultant molded article.

Examples of the polyfunctional aliphatic epoxy resin include a diglycidyl ether compound and a polyglycidyl ether. Specific examples of the diglycidyl ether compound include ethylene glycol diglycidyl ether, a polyethylene glycol diglycidyl ether compound, propylene glycol diglycidyl ether, a polypropylene glycol diglycidyl ether compound, 1,4-butanediol diglycidyl ether, neopentyl glycol diglycidyl ether, a polytetramethylene glycol diglycidyl ether compound and a polyalkylene glycol diglycidyl ether compound. Specific examples of the polyglycidyl ether compound include polyglycidyl ether compounds such as glycerol polyglycidyl ether, diglycerol polyglycidyl ether, a polyglycerol polyglycidyl ether compound, a sorbitol polyglycidyl ether compound, an arabitol polyglycidyl ether compound, a trimethylolpropane polyglycidyl ether compound, a trimethylolpropane glycidyl ether compound, a pentaerythritol polyglycidyl ether compound and an aliphatic polyhydric alcohol.

Among the aliphatic epoxy resins, a trifunctional or higher aliphatic epoxy resin is preferred, and an aliphatic polyglycidyl ether compound having at least three highly reactive glycidyl groups is more preferred. An aliphatic polyglycidyl ether compound has a good balance among flexibility, crosslinking density and compatibility with a matrix resin, and can further improve adhesiveness. Among aliphatic polyglycidyl ether compounds, glycerol polyglycidyl ether, diglycerol polyglycidyl ether, a polyglycerol polyglycidyl ether compound, a polyethylene glycol diglycidyl ether compound and a polypropylene glycol diglycidyl ether compound are more preferred.

The amount of the sizing agent to be adhered is preferably 0.01 to 10% by weight relative to the total amount, i.e., 100% by weight, of the sizing agent and the carbon fiber filament containing the carbon fibers (A). When the amount of the sizing agent to be adhered is 0.01% by weight or more, the adhesion to the thermoplastic resin (C) can be further improved. The amount of the sizing agent to be adhered is more preferably 0.05% by weight or more, still more preferably 0.1% by weight or more. When the amount of the sizing agent to be adhered is 10% by weight or less, on the other hand, the physical properties of the thermoplastic resin (C) can be maintained at higher levels. The amount of the sizing agent to be adhered is more preferably 5% by weight or less, still more preferably 2% by weight or less.

The means for applying the sizing agent is not particularly limited. One example of the means is a method in which a sizing treatment solution in which the sizing agent is dissolved (including a dispersed state) in a solvent (including a dispersion medium in the case where the sizing agent is dispersed) is prepared, the sizing treatment solution is then applied onto the carbon fibers, and the solvent is then dried/evaporated to remove the solvent. Example of the method of applying the sizing treatment solution onto the carbon fibers include: a method in which the carbon fibers are immersed in the sizing treatment solution through a roller; a method in which the carbon fibers are brought into contact with a roller onto which the sizing treatment solution is adhered; and a method in which the sizing treatment solution is atomized in the form of fine mists onto the carbon fibers. The means for applying the sizing agent may be in any one of a batch mode and a continuous mode, and is preferably in a continuous mode because productivity becomes good and the unevenness of adhesion can be minimized. In this regard, it is preferred to adjust the concentration or temperature of the sizing treatment solution or the tension of the carbon fibers so that the amount of the sizing agent adhered onto the carbon fibers can become uniform within a proper range. It is more preferred that the carbon fibers are vibrated with ultrasonic waves during the application of the sizing treatment solution.

The drying temperature and the drying time should be adjusted depending on the amount of the compound to be adhered. From the viewpoint of completely removing the solvent used in the sizing treatment solution, reducing the time required for the drying, preventing the occurrence of the thermal deterioration of the sizing agent, and preventing the sized carbon fibers (A) from being hardened and therefore preventing the expansion of the filament, the drying temperature is preferably 150° C. to 350° C., more preferably 180° C. to 250° C.

Specific examples of the solvent to be used in the sizing treatment solution include water, methanol, ethanol, dimethylformamide, dimethylacetamide and acetone. From the viewpoint of the easiness of handling and the prevention of disasters, water is preferred. Thus, when a compound that is water-insoluble or is poorly soluble in water is used as the sizing agent, it is preferred to add an emulsifying agent or a surfactant to disperse the compound in water upon use. Specific examples of the emulsifying agent or the surfactant to be used include: an anionic emulsifying agent such as a styrene-maleic anhydride copolymer, an olefin-maleic anhydride copolymer, and a condensation product of formalin and a naphthalene sulfonic acid salt, and sodium polyacrylate; a cationic emulsifying agent such as polyethyleneimine and polyvinylimidazoline; and a nonionic emulsifying agent such as a nonylphenol ethylene oxide adduct, polyvinyl alcohol, a polyoxyethylene ether ester copolymer and a sorbitan ester ethyl oxide adduct. A nonionic emulsifying agent having a low interaction hardly interferes with the adhesion effect of a functional group contained in the sizing agent, and is therefore preferred.

The content of the carbon fibers (A) in the molded article is 1 to 30 parts by weight relative to the total amount, i.e., 100 parts by weight, of the components (A) to (C). If the content of the carbon fibers (A) is less than 1 part by weight, the bending strength of the resultant molded article may be deteriorated. In addition, in this case, the effect of forming thermal conduction paths when used in combination with the below-mentioned graphite (B) may decrease, resulting in the deterioration in heat conductivity. The content is preferably 3 parts by weight or more, more preferably 5 parts by weight or more. If the content of the carbon fibers (A) is more than 30 parts by weight, on the other hand, the stiffness of the resultant molded article may become too high, resulting in the deterioration in bending strength. The content is preferably 25 parts by weight or less, more preferably 20 parts by weight or less. When the carbon fibers (A) is used in an amount of 1 to 30 parts by weight, when used combination with the below-mentioned graphite (B), thermal conduction paths can be formed easily and therefore the heat conductivity of the molded article can be improved easily.

The graphite (B) has an effect of improving the heat conductivity of the molded article. In addition, it is interesting that the weight average fiber length of the below-mentioned carbon fibers (A) in the molded article can be increased and the bending strength can be improved by adding the graphite (B). The heat conductivity of the molded article as measured in the thickness direction can also be improved. This is probably, but not certain, because the graphite (B) present around the carbon fibers (A) receives a shear force during molding to disperse the shear force and, therefore, the damage of the carbon fibers (A) can be prevented and the weight average fiber length of the carbon fibers (A) can be increased.

The graphite (B) is not particularly limited, and examples thereof include naturally occurring graphite and various artificial types of graphite. Specific examples of the naturally occurring graphite include amorphous graphite, vein graphite and scaly graphite. An artificial type of graphite refers to graphite produced by treating amorphous carbon with heat to artificially align fine graphite crystals having a non-regular orientation, and specific examples thereof include an artificial type of graphite that can be used in common carbon materials, Kish graphite, lytic graphite and pyrolytic graphite. An artificial type of graphite that can be in common carbon materials can be produced by a graphitization treatment using petroleum coke or coal-based pitch coke as the main raw material. Among these types of graphite, scaly graphite is preferred from the viewpoint of further improving bending strength and heat conductivity.

The largest particle diameter of the graphite (B) in the molded article is preferably 10 to 100 μm. When the largest particle diameter of the graphite (B) contained in the molded article is 10 µm or more, the formation of thermal conduction paths can be allowed to proceed efficiently and therefore heat conductivity can be further improved. When the largest particle diameter of the graphite (B) contained in the molded article is 100 µm or less, on the other hand, the appearance of the molded article can be improved. The largest particle diameter is more preferably 80 µm or less, still more preferably 60 µm or less.

The term "largest particle diameter of the graphite (B)" as used herein refers to an average value of particle diameters of 50 particles that are selected in descending order among from particles of the graphite (B) which are observed on a 200× to 2000× image of a cross section of a molded article. The term "average value" as used herein refers to an arithmetic average value obtained by dividing the sum total of particle diameters of the 50 particles by a numerical number 50. When the particles of the graphite observed on the image are not circular, the largest diameter of each particle is measured.

An example of the method of adjusting the largest particle diameter of the graphite (B) in the molded article to a value falling within the above-mentioned range is a method in which a fiber reinforced thermoplastic resin molding material in which the largest particle diameter of the graphite (B) falls within the below-mentioned preferred range is molded.

The content of the graphite (B) in the molded article is 1 to 40 parts by weight relative to the total amount, i.e., 100 parts by weight, of the components (A) to (C). If the content of the graphite (B) is less than 1 part by weight, the bending strength and heat conductivity of the resultant molded article may be deteriorated. The content is preferably 3 parts by weight or more, more preferably 5 parts by weight or more. If the content of the graphite (B) is more than 40 parts by weight, on the other hand, the stiffness of the resultant molded article becomes too high and the bending strength may be deteriorated. The content is more preferably 35 parts by weight or less, still more preferably 30 parts by weight or less.

The type of the thermoplastic resin (C) is not particularly limited, and specific examples thereof include a polyolefin resin, a polystyrene resin, a polyamide resin, a halogenated vinyl resin, a polyacetal resin, a saturated polyester resin, a polycarbonate resin, a polyaryl sulfone resin, a polyaryl ketone resin, a polyarylene ether resin, a polyarylene sulfide resin, a polyaryl ether ketone resin, a polyether sulfone resin, a polyarylene sulfide sulfone resin, a polyarylate resin, a liquid crystal polyester and a fluororesin. Two or more of these resins may be used in combination. In these resins, terminal groups may be capped or modified.

When the molded article is to be used in an electric/electronic devices or automotive parts, a resin selected from a polyamide resin, a polycarbonate resin and a polyarylene sulfide resin is more preferred among these thermoplastic resins, from the viewpoint of heat resistance.

A polyamide resin is a resin produced using an amino acid, a lactam or a diamine and a dicarboxylic acid as the main raw materials. Specific examples of the main raw materials include: an amino acid such as 6-aminocaproic acid, 11-aminoundecanoic acid, 12-aminododec-anoic acid and para-aminomethylbenzoic acid; a lactam such as ε-caprolactam and ω-lauro-lactam; an aliphatic diamine such as tetramethylenediamine, hexamethylenediamine, 2-methyl-pentamethylenediamine, nonamethylenediamine, undecamethylenediamine, dodecamethylenediamine, 2,2,4-/2,4,4-trimethylhexamethylenediamine and 5-methylnonamethylenediamine; an aromatic diamine such as metaxylylenediamine and paraxylylenediamine; an alicyclic diamine such as 1,3-bis(aminomethyl)cyclohexane, 1,4-bis (aminomethyl)cyclohexane, 1-amino-3-aminomethyl-3,5,5-trimethylcyclohexane, bis(4-aminocyclohexyl)methane, bis (3-methyl-4-aminocyclohexyl)methane, 2,2-bis(4-aminocyclohexyl)propane, bis(aminopropyl)piperazine and aminoethylpiperazine; an aliphatic dicarboxylic acid such as adipic acid, suberic acid, azelaic acid, sebacic acid and dodecanedioic acid; an aromatic dicarboxylic acid such as terephthalic acid, isophthalic acid, 2-chloroterephthalic acid, 2-methylterephthalic acid, 5-methylisophthalic acid, 5-sodium sulfoisophthalic acid, hexahydroterephthalic acid and hexahydroisophthalic acid; and an alicyclic dicarboxylic acid such as 1,4-cyclohexane dicarboxylic acid, 1,3-cyclohexane dicarboxylic acid and 1,2-cyclohexanedicarboxylic acid. Two or more of these compounds may be used in combination.

A polyamide resin having a melting point of 200° C. or higher is particularly useful, because of excellent heat resistance and strength thereof. Specific examples of the polyamide resin include polycapramide (nylon 6), polyhexamethylene adipamide (nylon 66), a polycapramide/polyhexamethylene adipamide copolymer (nylon 6/66), polytetramethylene adipamide (nylon 46), polyhexamethylene sebacamide (nylon 610), polyhexamethylene dodecamide (nylon 612), a polyhexamethylene terephthalamide/polycapramide copolymer (nylon 6T/6), a polyhexamethylene adipamide/polyhexamethylene terephthalamide copolymer (nylon 66/6T), a polylaurylamide/polyhexamethylene terephthalamide copolymer (nylon 12/6T), a polyhexamethylene adipamide/polyhexamethylene isophthalamide copolymer (nylon 66/6I), a polyhexamethylene adipamide/polyhexamethylene terephthalamide/polyhexamethylene isophthalamide copolymer (nylon 66/6T/6I), a polyhexamethylene adipamide/polyhexamethylene isophthalamide/polycapramide copolymer (nylon 66/6I/6), a polyhexamethylene terephthalamide/polyhexamethylene isophthalamide copolymer (nylon 6T/6I), a polyhexamethylene terephthalamide/polydodecanamide copolymer (nylon 6T/12), a polyhexamethylene terephthalamide/poly(2-methylpentamethylene) terephthalamide copolymer (nylon 6T/M5T), polymetaxylylene adipamide (nylon MXD6), polynonamethylene terephthalamide (nylon 9T) and copolymers thereof. Two or more of these polyamide resins may be used in combination.

The degree of polymerization of the polyamide resin is not particularly limited. It is preferred that the sulfuric acid relative viscosity $\eta_r$ of a solution prepared by dissolving 0.25 g of a polyamide resin in 25 ml of 98% concentrated sulfuric acid as measured at 25° C. is 1.5 to 5.0, more preferably 2.0 to 3.5, because the fluidity of the polyamide resin during molding is excellent and a thin molded article can be produced easily. The sulfuric acid relative viscosity $\eta_r$ is expressed as a ratio of the number of seconds required for the flow down of a 98% sulfuric acid solution having a resin concentration of 1 g/100 ml to the number of seconds required for the flow down of 98% sulfuric acid, wherein the number of seconds is measured in a thermostatic chamber at 25° C. with an Ostwald viscometer.

A polycarbonate resin is a resin produced by reacting a dihydric phenol with a carbonate precursor. The polycarbonate resin may be a copolymer produced using at least two types of dihydric phenols or at least two types of carbonate precursors. Examples of the reaction method include an interfacial polymerization method, a melt transesterification method, a carbonate prepolymer solid-phase transesterification method, and a cyclic carbonate compound ring-opening polymerization method. The polycarbonate resin is known by itself, and a polycarbonate resin disclosed in, for example, Japanese Patent Laid-open Publication No. 2002-129027 can be used.

Specific examples of the dihydric phenol include 1,1-bis (4-hydroxyphenyl)-3,3,5-trimethylcyclohexane, a bis(4-hydroxyphenyl)alkane (e.g., bisphenol A), 2,2-bis{(4-hydroxy-3-methyl)phenyl}propane, α,α'-bis(4-hydroxyphenyl)-m-diisopropylbenzene and 9,9-bis(4-hydroxy-3-methylphenyl)fluorene. Two or more of these dihydric phenols may be used in combination. Among these dihydric phenols, bisphenol A is preferred, because a polycarbonate resin having more superior impact strength can be produced. A copolymer produced using bisphenol A and another dihydric phenol is excellent because of the high heat resistance or low water absorbability thereof.

Examples of the carbonate precursor include a carbonyl halide, a carbonic acid diester and a haloformate. Specific examples include phosgene, diphenyl carbonate and a dihaloformate of a dihydric phenol.

In the production of a polycarbonate resin from the above-mentioned dihydric phenol and the above-mentioned carbonate precursor, a catalyst, a chain terminator, an antioxidant agent for preventing the oxidation of the dihydric phenol and the like may be used, if necessary.

The polycarbonate resin may be a branched polycarbonate resin produced by copolymerizing a polyfunctional aromatic compound having a functional value of 3 or more, a polyester carbonate resin produced by copolymerizing an aromatic or aliphatic (including alicyclic) bifunctional carboxylic acid, a copolymerized polycarbonate resin produced by copolymerizing a bifunctional (including alicyclic) alcohol, or a polyester carbonate resin produced by copolymerizing a bifunctional carboxylic acid and a bifunctional alcohol together. These polycarbonate resins are also known. Two or more of these polycarbonate resins may be used in combination.

The molecular weight of the polycarbonate resin is not particularly limited, and a polycarbonate resin having a viscosity average molecular weight of 10,000 to 50,000 is preferred. When the viscosity average molecular weight is 10,000 or more, the strength of the molded article can be further improved. The viscosity average molecular weight is more preferably 15,000 or more, still more preferably 18,000 or more. When the viscosity average molecular weight is 50,000 or less, on the other hand, moldability can be improved. The viscosity average molecular weight is more preferably 40,000 or less, still more preferably 30,000 or less. In the case where at least two types of polycarbonate resins are used, it is preferred that the viscosity average molecular weight of at least one of the polycarbonate resins falls within the above-mentioned range. In this case, it is preferred to use a polycarbonate resin having a viscosity average molecular weight of more than 50,000, preferably more than 80,000, as the other polycarbonate resin. This polycarbonate resin has a high entropy elasticity and is therefore advantageous when a gas-assist molding technique or the like is employed in combination. In addition, this polycarbonate resin can exhibit properties associated with the high entropy elasticity (e.g., dripping prevention properties, draw down properties, and properties of improving melt properties such as the improvement in jetting).

The viscosity average molecular weight (M) of the polycarbonate resin is determined by substituting a specific viscosity (ηsp), which is measured on a solution prepared by dissolving 0.7 g of polycarbonate in 100 ml of methylene chloride at 20° C., into the following equation:

$\eta sp/c = \{\eta\} + 0.45 \times \{\eta\}^2$ (wherein $\{\eta\}$ represents a limiting viscosity)

$\{\eta\} = 1.23 \times 10^{-4} M^{0.83}$ $c = 0.7$.

The melt viscosity of the polycarbonate resin is not particularly limited, and it is preferred that the melt viscosity at 200° C. is 10 to 25000 Pa·s. When the melt viscosity at 200° C. is 10 Pa·s or more, the strength of the molded article can be further improved. The melt viscosity is more preferably 20 Pa·s or more, still more preferably 50 Pa·s or more. When the melt viscosity at 200° C. is 25,000 Pa·s or less, on the other hand, moldability can be improved. The melt viscosity is more preferably 20,000 Pa·s or less, still more preferably 15,000 Pa·s or less.

As the polycarbonate resin, commercially available products such as those marketed under the tradenames of "Iupilon" (registered tradename) and "Novarex" (registered tradename) manufactured by Mitsubishi Engineering-Plastics Corporation, "Panlite" (registered tradename) manufactured by Teijin Chemicals Ltd., "Tarflon" (registered tradename) manufactured by Idemitsu Petrochemical Co., Ltd., can be used.

Specific examples of the polyarylene sulfide resin include a polyphenylene sulfide (PPS) resin, a polyphenylene sulfide sulfone resin, a polyphenylene sulfide ketone resin, and random or block copolymers thereof. Two or more of these polyarylene sulfide resins may be used in combination. Among these polyarylene sulfide resins, a polyphenylene sulfide resin is used particularly preferably.

The polyarylene sulfide resin can be produced by any method such as a method as disclosed in Japanese Patent Publication No. 45-3368 in which a polymer having a relatively small molecular weight is produced and a method as disclosed in Japanese Patent Publication No. 52-12240 and Japanese Patent Laid-open Publication No. 61-7332 in which a polymer having a relatively large molecular weight is produced.

The polyarylene sulfide resin thus produced may be subjected to: crosslinking/polymerization by heating; a heat treatment under an inert gas atmosphere (e.g., a nitrogen gas atmosphere) or under a reduced pressure; washing with an organic solvent, hot water, an aqueous acidic solution or the like; activation with a functional group-containing compound such as an acid anhydride, an amine, an isocyanate, a functional group-containing disulfide compound or the like; and other treatments.

An example of the method of crosslinking/polymerizing a polyarylene sulfide resin by heating is a method in which heating is carried out until a desired melt viscosity can be achieved at a predetermined temperature under an oxidative gas atmosphere (e.g., an air atmosphere, an oxygen atmosphere) or under a mixed gas atmosphere (e.g., an atmosphere of a mixed gas of the oxidative gas and an inert gas such as nitrogen gas or argon gas). The heating treatment temperature is preferably 200 to 270° C., and the heating treatment time is preferably 2 to 50 hours. The viscosity of the resultant polymer can be adjusted to a value falling within a desired range by controlling the treatment temperature and the treatment time. Examples of a heating treatment apparatus include a hot-air drier, a rotating heating apparatus, and a heating apparatus equipped with an impeller blade. From the viewpoint of carrying out the heating treatment with high efficiency and more uniformly, it is preferred to use a rotating heating apparatus or a heating apparatus equipped with an impeller blade.

When the polyarylene sulfide resin is to be treated under a reduced pressure, the pressure is preferably 7,000 Nm$^{-2}$ or less. Examples of a heating treatment apparatus include a hot-air drier, a rotating heating apparatus, and a heating apparatus equipped with an impeller blade. From the viewpoint of carrying out the heating treatment with high efficiency and more uniformly, it is preferred to use a rotating heating apparatus or a heating apparatus equipped with an impeller blade.

When the polyarylene sulfide resin is to be washed with an organic solvent, examples of the organic solvent include: a nitrogenated polar solvent such as N-methylpyrrolidone, dimethylformamide and dimethylacetamide; a sulfoxide/sulfone-based solvent such as dimethyl sulfoxide and dimethyl sulfone; a ketone-type solvent such as acetone, methyl ethyl ketone, diethyl ketone and acetophenone; an ether-type solvent such as dimethyl ether, dipropyl ether and tetrahydrofuran; a halogen-containing solvent such as chloroform, methylene chloride, trichloroethylene, ethylene dichloride, dichloroethane, tetrachloroethane and chlorobenzene; an alcohol/phenol-type solvent such as methanol, ethanol, propanol, butanol, pentanol, ethylene glycol, propylene glycol, phenol, cresol and polyethylene glycol; and an aromatic hydrocarbon-type solvent such as benzene, toluene and xylene. Two or more of these organic solvents may be used in combination. Among these organic solvents, N-methylpyrrolidone, acetone, dimethylformamide, chloroform and the like can be used preferably. An example of the method for washing with the organic solvent is a method in which the polyarylene sulfide resin is immersed in the organic solvent. If necessary, stirring or heating may also be carried out appropriately. The washing temperature at which the polyarylene sulfide resin is washed in the organic solvent is preferably ambient temperature to 150° C. It is preferred that the polyarylene sulfide resin that has been washed with the organic solvent is washed with water or warm water several times for the purpose of removing the residual organic solvent.

When the polyarylene sulfide resin is to be washed with hot water, the water to be used is preferably distilled water or deionized water for the purpose of exerting an effect caused as the result of desired chemical modification of the polyarylene sulfide resin by washing with hot water. In general, washing with hot water is carried out by introducing a predetermined amount of the polyarylene sulfide resin into a predetermined amount of water and then heating/stirring the mixed solution under ambient pressure of in a pressure container, for the purpose of exerting an effect caused as the result of desired chemical modification of the polyarylene sulfide resin by washing with hot water. The liquor ratio of the polyarylene sulfide resin to water is preferably 200 g or less of the polyarylene sulfide resin per 1 liter of water.

An example of the method of treating the polyarylene sulfide resin with an acid is a method in which the polyarylene sulfide resin is immersed in an acid or an aqueous solution of an acid. If necessary, stirring or heating may also be carried out appropriately. Examples of the acid include: an aliphatic saturated monocarboxylic acid such as formic acid, acetic acid, propionic acid and butyric acid; a halo-substituted aliphatic saturated carboxylic acid such as chloroacetic acid and dichloroacetic acid; an aliphatic unsaturated monocarboxylic acid such as acrylic acid and crotonic acid; an aromatic carboxylic acid such as benzoic acid and salicylic acid; a dicarboxylic acid such as oxalic acid, malonic acid, succinic acid, phthalic acid and fumaric acid; and an inorganic acidic compound such as sulfuric acid, phosphoric acid, hydrochloric acid, carbonic acid and silicic acid. Among these acids, acetic acid or hydrochloric acid is preferably used. It is preferred that an acid-treated polyarylene sulfide resin is washed with water or warm water several times for the purpose of removing a residual acid or salt. The water to be used for the washing is preferably distilled water or deionized water.

It is preferred that the melt viscosity of the polyarylene sulfide resin as measured at 310° C. and at a shear rate of 1000/sec is 80 Pa·s or less. The lower limit is not particularly limited, and is preferably 5 Pa·s or more. At least two types of polyarylene sulfide resins having different melt viscosities from each other may be used in combination. The melt viscosity can be measured using a device "Capilograph" (manufactured by Toyo Seiki Co. Ltd.) under the conditions of a die length of 10 mm and a die hole diameter of 0.5 to 1.0 mm.

As the polyarylene sulfide resin, commercially available products such as those marketed under the tradenames of "Torelina" (registered tradename) manufactured by Toray Industries, Inc., "DIC.PPS" (registered tradename) manufactured by DIC Corporation, and "Durafide" (registered tradename) manufactured by Polyplastics Co., Ltd., can be used.

The content of the thermoplastic resin (C) in the molded article is 30 to 98 parts by weight relative to the total amount, i.e., 100 parts by weight, of the components (A) to (C). If the content of the thermoplastic resin (C) is less than 30 parts by weight, the bending strength of the resultant molded article may be deteriorated. The content is preferably 40 parts by weight or more, more preferably 50 parts by weight or more. If the content of the thermoplastic resin (C) is more than 98 parts by weight, the stiffness of the resultant molded article may be deteriorated and the contents of the carbon fibers (A) and the graphite (B) become relatively small. The content is preferably 94 parts by weight or less, more preferably 90 parts by weight or less.

It is preferred that the molded article additionally contains a component (D) which has a lower melt viscosity than that of the thermoplastic resin (C). In this case, the dispersibility of the carbon fibers (A) in the thermoplastic resin (C) in injection molding can be improved. Examples of the component (D) having a lower melt viscosity than that of the thermoplastic resin (C) include an epoxy resin, a phenolic resin, a terpene resin, and a cyclic polyarylene sulfide. Two or more of these resins may be used in combination. Hereinafter, a compound (D) selected from an epoxy resin, a phenolic resin, a terpene resin and a cyclic polyarylene sulfide sometimes refers to a "component (D)." The compound serves as an immersion aid or a dispersion aid which can help to form a composite fiber filament (E) in conjunction with the carbon fibers (A), and which can also help to allow the carbon fibers (A) to be impregnated with the thermoplastic resin (C) during molding, and can also help to disperse the carbon fibers (A) in the thermoplastic resin (C).

The component (D) is preferably has high affinity for the thermoplastic resin (C). When a component (D) having high affinity for the thermoplastic resin (C) is selected, the component (D) can be compatibilized with the thermoplastic resin (C) with high efficiency during the production or molding of the molding material and, therefore, the dispersibility of the carbon fibers (A) can be further improved.

The component (D) is selected appropriately depending on the combination with the thermoplastic resin (C). For example, when the molding temperature is 150 to 270° C., a terpene resin is used preferably. When the molding temperature is 270 to 320° C., a compound selected from an epoxy resin, a phenolic resin and a cyclic polyarylene sulfide is used preferably. Specifically, when the thermoplastic resin (C) is a polypropylene resin, the component (D) is preferably a terpene resin. When the thermoplastic resin (C) is a polycarbonate resin or a polyarylene sulfide resin, the component (D) is preferably a compound selected from an epoxy resin, a phenolic resin and a cyclic polyarylene sulfide. When the thermoplastic resin (C) is a polyamide resin, the component (D) is preferably a terpene phenolic resin.

The melt viscosity of the component (D) at 200° C. is preferably 0.01 to 10 Pa·s. When the melt viscosity at 200° C. is 0.01 Pa·s or more, the fracture originated from a point at which the component (D) is present can be prevented more effectively and the impact strength of the molded article can be further improved. The melt viscosity is more preferably 0.05 Pa·s or more, still more preferably 0.1 Pa·s or more. When the melt viscosity at 200° C. is 10 Pa·s or less, on the other hand, it becomes possible to allow the component (D) to reach the middle part of the carbon fibers (A) more easily. In this case, the dispersibility of the carbon fibers (A) can be further improved during the molding of the molding material. The melt viscosity is preferably 5 Pa·s or less, more preferably 2 Pa·s or less. In this regard, the melt viscosity of the component (D) at 200° C. can be measured by a viscoelasticity measurement device using a 40-mm parallel plate at 0.5 Hz.

As mentioned below, in adhesion of the component (D) onto the carbon fibers (A) to produce a composite fiber filament (E), the melting temperature (i.e., the temperature in a melting bath) to be employed for supplying the component (D) is preferably 100 to 300° C. Then, attention is focused on the melt viscosity of the component (D) at 200° C. as a measure of the impregnation of the carbon fibers (A) with the component (D). When the melt viscosity at 200° C. falls within the above-mentioned preferred range, impregnation of the carbon fibers (A) with the component (D) is excellent at a melting temperature falling within the above-mentioned preferred range. Therefore, dispersibility of the carbon fibers (A) can be further improved and the impact strength of the molded article can also be further improved.

The rate of change in the melt viscosity of the component (D) at 200° C. after heating for 2 hours is preferably 2% or less. The rate of change in the melt viscosity can be determined by Formula (1) below:

(Rate of change in the melt viscosity [%]={|(the melt viscosity of the component (D) at 200° C. after heating for 2 hours)−(the melt viscosity of the component (D) at 200° C. before the heating)|/(the melt viscosity of the component (D) at 200° C. after heating for 2 hours)}×100    (1).

By adjusting the rate of change in the melt viscosity to 2% or less, the non-uniform adhesion or the like can be prevented during production of the composite fiber filament (E) and, therefore, the steady production of the composite fiber filament (E) can be secured. The rate of change in the melt viscosity is more preferably 1.5% or less, still more preferably 1.3% or less.

The rate of change in the melt viscosity of the component (D) can be determined by the following method. First, the melt viscosity at 200° C. is measured by a viscoelasticity measurement device using a 40-mm parallel plate at 0.5 Hz. Subsequently, the component (D) is allowed to leave for 2 hours in a hot-air drier at 200° C., and then the melt viscosity at 200° C. is measured in the same manner as mentioned above. Subsequently, the rate of change in the melt viscosity is calculated in accordance with Formula (1).

It is also preferred that the loss on heating of the component (D) as measured at a molding temperature under the condition of the temperature rising rate of 10° C./min. (in air) is 5% by weight or less. When the loss on heating is 5% by weight or less, generation of a decomposed gas during the impregnation can be prevented, and formation of voids in the composite fiber filament (E) can also be prevented. In addition, defects caused by a volatile matter in the molded article can also be prevented. The loss on heating is more preferably 3% by weight or less.

The "loss on heating" represents the weight loss ratio of the component (D) before and after heating under the heating conditions, wherein the weight of the component (D) before heating is 100%. The loss on heating can be determined by Formula (2) shown below. The weight before and after heating can be determined by measuring the weight at a molding temperature by thermogravimetric analysis (TGA) using a platinum sample pan under an air atmosphere under the condition of a temperature raising rate of 10° C./min.

(Loss on heating) [% by weight]={(weight before heating)−(weight after heating)/(weight before heating)}×100    (2)

The epoxy resin preferably used as the component (D) is a compound having at least two epoxy groups, contains substantially no curing agent, and cannot be cured through a so-called "three-dimensional crosslinking" even when heated heating. The epoxy resin has epoxy groups and, therefore, can interact with the carbon fibers (A) easily, and can become compatible with the below-mentioned composite fiber filament (E) easily and, therefore, can penetrate into the composite fiber filament (E) easily. In addition, the epoxy resin can also improve dispersibility of the carbon fibers (A) during a molding processing.

Examples of the epoxy resin include a glycidyl ether-type epoxy resin, a glycidyl ester-type epoxy resin, a glycidyl amine-type epoxy resin and an alicyclic epoxy resin. Two or more of these epoxy resins may be used in combination.

Specific examples of the glycidyl ether-type epoxy resin include a bisphenol A-type epoxy resin, a bisphenol F-type epoxy resin, a bisphenol AD-type epoxy resin, a halogenated bisphenol A-type epoxy resin, a bisphenol S-type epoxy resin, a resorcinol-type epoxy resin, a hydrogenated bisphenol A-type epoxy resin, a phenol novolak-type epoxy resin, a cresol novolak-type epoxy resin, an aliphatic epoxy resin having an ether bond, a naphthalene-type epoxy resin, a biphenyl-type epoxy resin, a biphenyl aralkyl-type epoxy resin and a dicyclopentadiene-type epoxy resin.

Specific examples of the glycidyl ester-type epoxy resin include hexahydrophthalic acid glycidyl ester and dimer acid diglycidyl ester.

Specific examples of the glycidyl amine-type epoxy resin include triglycidyl isocyanurate, tetraglycidyl diaminodiphenylmethane, tetraglycidyl metaxylenediamine and an aminophenol-type epoxy resin.

Specific examples of the alicyclic epoxy resin include 3,4-epoxy-6-methylcyclohexylmethyl carboxylate and 3,4-epoxycyclohexylmethyl carboxylate.

Among these compounds, a glycidyl ether-type epoxy resin is preferred because of the good balance between viscosity and heat resistance thereof, and a bisphenol A-type epoxy resin and a bisphenol F-type epoxy resin are more preferred.

The number average molecular weight of the epoxy resin that is used as the component (D) is preferably 200 to 5000. When the number average molecular weight of the epoxy resin is 200 or more, the mechanical properties of the molded article can be further improved. The number average molecular weight is more preferably 800 or more, still more preferably 1000 or more. When the number average molecular weight of the epoxy resin is 5000 or less, on the other hand, the penetration into the composite fiber filament (E) becomes excellent and, therefore, the dispersibility of the carbon fibers (A) can be further improved. The number average molecular weight is more preferably 4000 or less, still more preferably 3000 or less. The number average molecular weight of the epoxy resin can be determined by employing gel permeation chromatography (GPC).

An example of the terpene resin that is used as the component (D) is a polymer produced by polymerizing a terpene monomer in an organic solvent in the presence of a Friedel-Crafts-type catalyst, or by copolymerizing a terpene monomer with an aromatic monomer or the like.

Specific examples of the terpene monomer include α-pinene, β-pinene, dipentene, d-limonene, myrcene, alloocimene, ocimene, α-phellandrene, α-terpinene, γ-terpinene, terpinolen, 1,8-cineol, 1,4-cineol, α-terpineol, β-terpineol, γ-terpineol, sabinene, a para-menthadiene compound, and a careen compound. Specific examples of the aromatic monomer include styrene and α-methylstyrene.

In addition, it is also possible to use a hydrogenated terpene resin produced by hydrogenating the terpene resin or a terpene phenolic resin produced by reacting the terpene monomer with a phenol compound with a catalyst. As the phenol compound, a phenol compound in which one to three substituents independently selected from an alkyl group, a halogen atom and a hydroxy group are located on the benzene ring in phenol is used preferably. Specific examples of the phenol compound of this type include cresol, xylenol, ethylphenol, butylphenol, t-butylphenol, nonylphenol, 3,4,5-trimethylphenol, chlorophenol, bromophenol, chlorocresol, hydroquinone, resorcinol and orcinol. Two or more of these compounds may be used. Among these compounds, phenol and cresol are preferred.

The glass transition temperature of the terpene resin is not particularly limited, and is preferably 30 to 100° C. When the glass transition temperature is 30° C. or higher, the handling properties of the component (D) during a molding processing become superior. When the glass transition temperature is 100° C. or lower, the fluidity of the component (D) during a molding processing can be controlled appropriately, and therefore moldability can be improved.

The number average molecular weight of the terpene resin is preferably 200 to 5000. When the number average molecular weight is 200 or more, the bending strength and tensile strength of the molded article can be further improved. When the number average molecular weight is 5000 or less, the viscosity of the terpene resin is moderately low and, therefore, penetration of the terpene resin becomes superior, resulting in the further improvement in the dispersibility of the carbon fibers (A) in the molded article. The number average molecular weight of the terpene resin can be determined by employing gel permeation chromatography (GPC).

The phenolic resin which is used as the component (D) is a thermoplastic polymer having a phenol backbone. The phenol backbone may have a substituent, and may be a cresol backbone or a naphthol backbone. Specific examples of the phenolic resin include a phenol novolak resin, an o-cresol novolak resin, a phenol aralkyl resin, a naphthol novolak resin and a naphthol aralkyl resin. Among these phenolic resins, an o-cresol novolak resin is used preferably because an o-cresol novolak resin has a good balance between heat resistance and a handling property such as a melt viscosity and therefore can increase the take-up speed for the composite fiber filament (E).

A preferred example of the cyclic polyarylene sulfide which is used as the component (D) is a cyclic polyphenylene sulfide having a repeating unit represented by structural formula (X) shown below as the main constituent unit. The compound more preferably contains the repeating unit at a content ratio of 80% by weight or more, more preferably 90% by weight or more, still more preferably 95% by weight or more.

From the viewpoint of controlling the viscosity of the cyclic polyarylene sulfide at a moderate level to further improve penetration of the cyclic polyarylene sulfide into the carbon fibers (A), the weight average molecular weight of the cyclic polyarylene sulfide is preferably less than 10,000, more preferably 5,000 or less, still more preferably 3,000 or less. From the viewpoint of further improving the mechanical properties of the molded article, the weight average molecular weight of the cyclic polyarylene sulfide resin is preferably 300 or more, more preferably 400 or more, still more preferably 500 or more.

Examples of the method of producing the cyclic polyarylene sulfide include the following methods:

(1) a method in which a polymerization reaction is carried out by heating a mixture containing at last a polyhalogenated aromatic compound, a sulfidizing agent and an organic polar solvent to prepare a mixture containing a granular polyarylene sulfide (PAS) resin, a polyarylene sulfide oligomer, the organic polar solvent, water and a halogenated alkali metal salt, and subsequently the polyarylene sulfide oligomer contained in the mixture is separated, collected and then purified to produce a cyclic polyarylene sulfide; and (2) a method in which a polymerization reaction is carried out by heating a mixture containing at least a polyhalogenated aromatic compound, a sulfidizing agent and an organic polar solvent, subsequently a product of the polymerization reaction is purified by a known method to produce a PAS resin containing a PAS prepolymer, and subsequently the PAS resin is subjected to extraction with a solvent in which the PAS resin cannot be dissolved substantially but the PAS prepolymer can dissolve, thereby collecting a cyclic PAS.

The content of the component (D) in the molded article is preferably 0.1 to 15 parts by weight relative to the total amount, i.e., 100 parts by weight, of the components (A) to (C). When the content of the component (D) is 0.1 part by weight or more, the dispersibility of the carbon fibers (A) can be further improved. The content of the component (D) is more preferably 0.5 part by weight or more, still more preferably 0.8 part by weight or more. When the content of the component (D) is 15 parts by weight or less, on the other hand, the bending strength of the molded article can be further improved. The content of the component (D) is more preferably 10 parts by weight or less, still more preferably 8 parts by weight or less.

In the molded article, it is preferred that the weight average fiber length of the carbon fibers (A) present in the molded article is 0.3 to 3 mm. The strength of the carbon fibers in the length direction is higher. Therefore, the bending strength of the molded article can be improved with the increase in the fiber lengths in the molded article. The same applies to the heat conductivity. That is, the heat conductivity of the carbon fibers in the length direction is higher. Therefore, thermal conduction paths can be formed more easily and consequently the heat conductivity can be further improved with the increase in the fiber lengths in the molded article. When the weight average fiber length of the carbon fibers (A) present in the molded article is 0.3 mm or more, the bending strength can be further improved. In addition, because thermal conduction paths can be formed in the thickness direction of the molded article with higher efficiently, heat conductivity can be further improved. The weight average fiber length of the carbon fibers (A) is more preferably 0.35 mm or more, still more preferably 0.4 mm or more. When the weight average fiber length of the carbon fibers (A) present in the molded article is 3 mm or less, dispersibility of the carbon fibers (A) can be further improved and the appearance of the molded article can also be improved. The weight average fiber length of the carbon fibers (A) is more preferably 2 mm or less, still more preferably 1.5 mm or less.

The term "weight average fiber length" of the carbon fibers (A) as used herein refers to an average fiber length obtained not by simply determining a number average value, but by applying the method of calculating a weight average molecular weight to the calculation of a fiber length and calculating the weight average fiber length from the equation shown below in which the contribution of a fiber length is taken into consideration. In the equation below, it is hypothesized that the fiber diameters and the density of the carbon fibers (A) are constant.

Weight average fiber length=$\Sigma(Mi^2 \times Ni)/\Sigma(Mi \times Ni)$

Mi: a fiber length (mm)
Ni: the number of reinforcing fibers each having a fiber length of Mi The weight average fiber length can be determined in the following manner. A molded article is placed on a hot stage set at 200 to 300° C. while sandwiching the molded article between glass plates, and the molded article is melted by heating to produce a film in which the carbon fibers (A) are dispersed uniformly. The film is observed with an optical microscope (magnification: 50 to 200 folds). The fiber lengths of randomly selected 1000 carbon fibers (A) are measured, and the weight average fiber length is calculated using the above-mentioned equation.

The weight average fiber length of the carbon fibers (A) present in the molded article can be controlled by altering the types of the carbon fibers (A), the molding conditions to be employed and the like. In injection molding, the molding conditions include a pressure-relating condition (e.g., a back pressure, a hold pressure), a time-relating condition (e.g., an injection time, a hold time), and a temperature-relating condition (e.g., a cylinder temperature, a mold temperature).

It is preferred that the molded article has a specific gravity of 1.1 to 1.9 g/cm$^3$. Although the carbon fibers (A) have excellent specific strength, the specific gravity of the carbon fibers (A) is larger compared with that of the thermoplastic resin (C). Although the graphite (B) has excellent heat conductivity, the specific gravity of the graphite (B) is larger compared with that of the thermoplastic resin (C). Hitherto, the heat conductivity of the molded article is increased by compounding the carbon fibers (A) and the graphite (B) in larger amounts. In this case, however, the resultant molded article has a large specific gravity and the molded article becomes brittle and, therefore, it is difficult to increase the bending strength of the molded article. As mentioned above, it becomes easier to form thermal conduction paths by adjusting the weight average fiber length of the carbon fibers (A) to 0.3 to 3 mm. Therefore, it becomes possible to produce a molded article having a high level of heat conductivity never before possible, a small specific gravity, and excellent bending strength by adding the carbon fibers (A) and the graphite (B) in small amounts. From the viewpoint of reducing weight of the molded article and economic efficiency, the specific gravity of the molded article is preferably 1.9 g/cm$^3$ or less, more preferably 1.8 g/cm$^3$ or less, still more preferably 1.7 g/cm$^3$ or less. On the other hand, from the viewpoint of further improvement in bending strength and heat conductivity of the molded article, the specific gravity of the molded article is preferably 1.2 g/cm$^3$ or more, more preferably 1.3 g/cm$^3$ or more.

The specific gravity of the molded article can be determined by a liquid immersion method. An example of the method of adjusting the specific gravity to a value falling within the above-mentioned range is a method in which the carbon fibers (A) and the graphite (B) are used in amounts respectively falling within the above-mentioned ranges.

The molded article is provided with a skin layer, a core layer and a skin layer in this order as observed in the thickness direction. It is preferred that the thickness of the core layer is 20 to 60% relative to the thickness of the molded article. The skin layer is a layer which is located closer to the surface of the molded article, and in which the carbon fibers (A) are aligned in the direction of flow during injection molding. Specifically, the skin layer is a layer in which the angle of the main orientation direction of the carbon fibers (A) is more than 40 degrees wherein the angle of the direction perpendicular to the cross section taken along the flow direction during injection molding, i.e., the angle of the direction of the thickness of the molded article, is 0 degree. The core layer is a layer closer to the middle part of the molded article, and in which the carbon fibers (A) are aligned in the direction of the thickness of the molded article. Specifically, the core layer is a layer in which the angle of the main orientation direction of the carbon fibers (A) is 40 degrees of less in which the angle of the direction of the thickness of the molded article is 0 degree. The term "angle" as used herein refers to an angle that is smaller among angles formed between the main orientation direction of the carbon fibers measured as mentioned above and the 0 degree direction, and has a positive value regardless a clockwise direction or an anticlockwise direction. The matter that the thickness of the core layer is adjusted to 20% or more means that the orientation of the carbon fibers (A) in the thickness direction is increased. In this case, heat conductivity in the thickness direction can be further improved. The thickness of the core layer is more preferably 25% or more, still more preferably 30% or more. When the thickness of the core layer is adjusted to 60% or less, on the other hand, the balance between bending strength and heat conductivity can be further improved. The thickness of the core layer is more preferably 55% or less, still more preferably 50% or less.

The main orientation direction of the carbon fibers and the thickness of the core layer can be determined by the following method. First, an image of the carbon fibers (A) on one arbitrary cross section of a molded article is obtained using a three-dimensional measurement X-ray analyzer (model TDM1000IS) (manufactured by Yamato Material Co., Ltd.). The shape of the molded article to be used for the measurement is not particularly limited, and it is preferred that the molded article is cut into a piece in which a measurement section has a thickness of about 2 mm and a width of about 5 mm for the purpose of obtaining clear image data. With respect to the part to be measured in the molded article, a part adjacent to a gate, a weld, or an end part in injection molding is not preferred, and a middle part between a gate and a weld or an end part is preferred. It is also preferred that the thickness of the part is not greatly varied. When the molded article is a dumbbell-shaped test specimen, the center part of the test specimen is suitable for the measurement. It is preferred to align the cross section to be cut out for the measurement with the direction of flow during injection molding as close as possible. In this regard, the amount of departure between the cross section and the direction of flow during molding of 20 degrees or less is acceptable. When the direction of flow is unknown, the measurement is carried out while staggering the angle of cutting out the cross section 30 degrees apart, and an angle at which one carbon fiber can be determined as being longest, among the angles measured, is employed. Image data thus obtained is binarized with respect to the carbon fibers (A) and the thermoplastic resin (C) using three-dimensional image processing software TRI series manufactured by RATOC System Engineering Co., Ltd., and then the main orientation direction is calculated from the direction of the orientation of the carbon fibers (A). When the direction of flow of the molding material during production of the molded article is defined as 90 degrees and the direction perpendicular to the direction of flow of the molding material is defined as 0 degree, a part in which the main orientation direction is 40 degrees or less is defined as a core layer and the thickness of the part is measured. The thickness of the molded article is measured in one cross section on which the thickness of the core layer is measured, and then the ratio of the thickness of the molded article to the thickness of the core layer is calculated.

Figure 5:
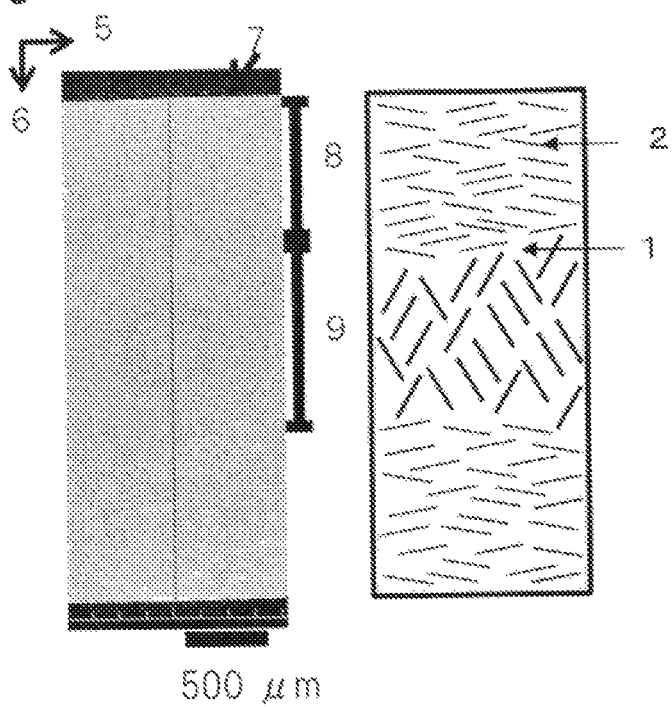
FIG. 5 shows one preferred example of the cross-sectional image of the molded article, and a schematic illustration of the example.
Figure 6:
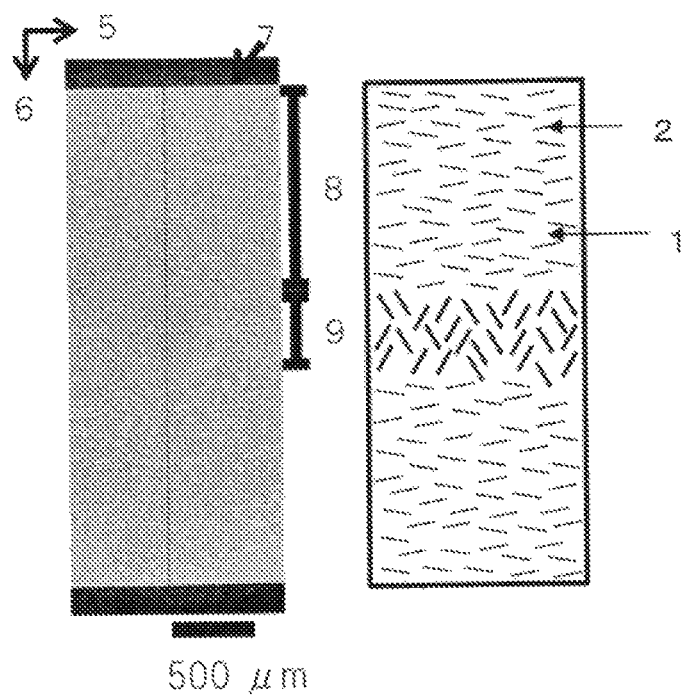
FIG. 6 shows one example of the cross-sectional image of a conventional molded article and a schematic illustration of the example.

One example of the image of a cross section of our molded article is shown in FIG. 5, and one example of the image of a cross section of a conventional molded article is shown in FIG. 6. In FIGS. 5 to 6, the number 5 indicates the planar direction of the molded article, the number 6 indicates the thickness direction of the molded article, the number 7 indicates the surface of the molded article, the number 8 indicates a skin layer of the molded article, and the number 9 indicates a core layer of the molded article. The direction of flow of the molding material is the direction indicated by the number 5. As shown in FIG. 5, when the weight average fiber length of the carbon fibers (A) 2 contained in the molded article is longer, the thickness of the core layer 9 becomes larger. On the other hand, as shown in FIG. 6, in the case where the weight average fiber length of the carbon fibers (A) 2 contained in the molded article is shorter, the thickness of the core layer 9 becomes smaller. One example of the method of adjusting the ratio of the thickness of the molded article to the thickness of the core layer to a value falling within the above-mentioned preferred range is a method in which the weight average fiber length of the carbon fibers (A) contained in the molded article is adjusted to a value falling within the above-mentioned preferred range.

It is preferred that the heat conductivity of the molded article as measured by a conventional method in the direction of the thickness of the molded article is 0.3 to 5 W/m·K. The heat conductivity is more preferably 0.4 W/m·K or more, still more preferably 0.5 W/m·K or more. On the other hand, from the viewpoint of avoiding the malfunctioning of an electronic device which may be caused by the conduction of heat to another part before the occurrence of heat dissipation, the heat conductivity in the thickness direction is preferably 5 W/m·K or less, more preferably 4.5 W/m·K or less, still more preferably 4 W/m·K or less.

The term "heat conductivity of a molded article" as used herein refers to a heat conductivity at 80° C., and can be measured using GH-1S manufactured by ULVAC-RIKO, Inc.

The term "direction of the thickness of a molded article" as used herein refers to a direction which is perpendicular to the direction of flow during injection molding. When the molded article is used as a housing for a part that can produce heat, it becomes possible to dissipate heat more effectively by increasing the heat conductivity in the thickness direction. As mentioned above, the ratio of the thickness of the core layer to the thickness of the molded article can be increased properly and the heat conductivity in the thickness direction can be further improved by adjusting the weight average fiber length of the carbon fibers (A) present in the molded article to a value falling within the above-mentioned preferred range. One example of the method of adjusting the heat conductivity in the direction of the thickness of the molded article to a value falling within the above-mentioned preferred range is a method in which the weight average fiber length of the carbon fibers (A) present in the molded article is adjusted to a value falling within the above-mentioned preferred range.

It is preferred that the molded article has bending strength of 150 to 300 MPa. When the bending strength is 150 MPa or more, durability of the molded article can be improved. The bending strength is more preferably 180 MPa or more, still more preferably 200 MPa or more. The bending strength of the molded article can be determined in accordance with ISO 178:2001.

It is preferred that the molded article has notched Charpy impact strength of 7 kJ/m$^2$ or more. When the impact strength is 7 kJ/m$^2$ or more, durability of the molded article can be improved. The impact strength is more preferably 8 kJ/m$^2$ or more, still more preferably 9 kJ/m$^2$ or more. One example of the method of adjusting a value falling within the above-mentioned preferred range is a method in which the weight average fiber length of the carbon fibers (A) present in the molded article is adjusted to a value falling within the above-mentioned preferred range. The notched Charpy impact strength of the molded article can be measured using a test specimen, which is subjected to a notch processing in accordance with ISO 2818:2010, in accordance with ISO 179-1:1994 using a hammer at 1.0 J.

It is preferred that the molded article has an electromagnetic wave shielding property of 10 to 40 dB as measured at a thickness of 3 mm and at 1 GHz. The electromagnetic wave shielding property is more preferably 15 dB or more. The electromagnetic wave shielding property of the molded article can be determined by a KEC method. One example of the method of adjusting the electromagnetic wave shielding property of the molded article to a value falling within the above-mentioned preferred range is a method in which the weight average fiber length of the carbon fibers (A) present in the molded article is adjusted to a value falling within the above-mentioned preferred range.

Next, the fiber reinforced thermoplastic resin molding material (also simply referred to as the "molding material," hereinafter) will be described in detail. In this regard, the term "molding material" as used herein refers to a raw material used in the production of a molded article by injection molding or the like.

The molding material comprises (A) carbon fibers, (B) graphite, (C) a thermoplastic resin, and a component (D) selected from an epoxy resin, a phenolic resin, a terpene resin and a cyclic polyarylene sulfide, wherein the carbon fibers (A), the graphite (B), the thermoplastic resin (C) and the component (D) are contained in amounts of 1 to 30 parts by weight, 1 to 40 parts by weight, 30 to 98 parts by weight and 0.1 to 15 parts by weight, respectively, relative to the total amount, i.e., 100 parts by weight, of the carbon fibers (A), the graphite (B) and the thermoplastic resin (C). Specific examples of the components (A) to (D) include those exemplified as the components to be contained in the molded article.

It is preferred that the molding material has such a structure that a composite fiber filament (E) comprising the carbon fibers (A) with the component (D) is covered with a composition containing the graphite (B) and the thermoplastic resin (C). If necessary, the composition containing the thermoplastic resin (C) may additionally contain other components. The term "covered structure" as used herein refers to a structure in which a composition containing the thermoplastic resin (C) is arranged on the surfaces of the composite fiber filament (E) to adhere the composition to the composite fiber filament (E). One preferred example of the method of producing the structure is a method in which a composition containing the molten thermoplastic resin (C) is arranged to contact with the composite fiber filament (E) and then the resultant product is cooled/solidified. The procedure for the method is not particularly limited. Specifically, a method in which a composition containing the thermoplastic resin (C) is coated continuously around the composite fiber filament (E) using an extruder and a coating die for electric wire coating use, and a method in which a composition containing a molten film-like thermoplastic resin (C) is arranged on one surface or both surfaces of the composite fiber filament (E) which is flattened with a roll or the like using an extruder and a T-die and then the composition and the composite fiber filament (E) are integrated with each other using a roll or the like can be mentioned.

FIG. 1 is a schematic illustration of one preferred example of the vertical cross section of the molding material. The term "vertical cross section" as used herein refers to a cross section taken on a plane containing an axial core direction. In FIG. 1, the number 1 indicates the thermoplastic resin (C), the number 2 (a black part) indicates the carbon fiber (A), the number 3 (a white part) indicates the component (D), and the number 4 indicates the composite fiber filament (E).

It is preferred that, in the molding material, single fibers in the carbon fibers (A) (2) are aligned almost parallel with the axial core direction of the molding material. It is also preferred that the lengths of the carbon fibers (A) (2) are substantially the same as the length of the molding material.

The wording "align almost parallel" as used herein refers to a state where the axis line of the major axis of each of the carbon fibers (A) and the axis line of the major axis of the molding material face the same direction. The angle formed between the axis lines is preferably 20° or lower, more preferably 10° or lower, still more preferably 5° or lower. The term "substantially the same length" as used herein refers to a matter that the carbon fibers (A) are not broken intentionally in the molding material or a matter that carbon fibers (A) that are significantly shorter than the whole length of the molding material are not contained substantially. The content of the carbon fibers (A) that are shorter than the whole length of the molding material is not particularly limited. The content of the carbon fibers (A) each having a length that is 50% or less of the whole length of the molding material is preferably 30% by mass or less, more preferably 20% by mass or less, relative to the whole amount of the carbon fibers (A). When the carbon fibers (A) have substantially the same length as that of the molding material, the lengths of the carbon fibers in the molded article can be increased and therefore impact strength can be further improved.

The molding material may be unbroken or may be cut into pieces each having a specific length as long as almost the same cross-sectional shape can be kept as observed in the axial core direction. From the viewpoint of satisfactorily improving the fluidity and handling properties during molding, it is preferred that the molding material is cut into pieces each having a length of 1 to 50 mm. A particularly preferred example of the molding material cut into pieces each having a proper length is the form of fiber pellets each having a length suitable for injection molding.

Figure 2:
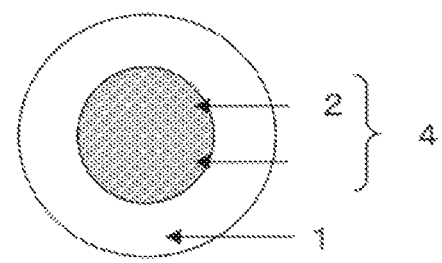
FIG. 2 shows a schematic illustration of one preferred example of the transverse cross section of the molding material.
Figure 3:
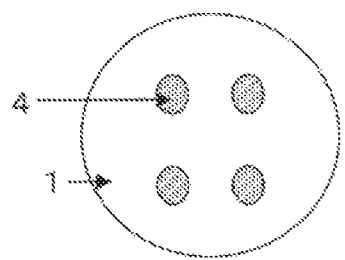
FIG. 3 shows a schematic illustration of one preferred example of the transverse cross section of the molding material.

The form of the cross section of the molding material is not limited to that illustrated in the figure, as long as the composition containing the thermoplastic resin (C) is arranged such that the composition can be adhered onto the composite fiber filament (E). The form of the vertical cross section is preferably one in which the composite fiber filament (E) serves as a core material and is sandwiched by the composition containing the thermoplastic resin (C) to form a layered structure, as illustrated in FIG. 1. The form of the transverse cross section is preferably one in which the composite fiber filament (E) serves as a core structure and the composition containing the thermoplastic resin (C) is arranged around the composite fiber filament (E) to coat the composite fiber filament (E) to form a core-sheath structure, as illustrated in FIG. 2. When multiple composite fiber filaments (E) are arranged to be covered with the composition containing the thermoplastic resin (C) as illustrated in FIG. 3, the number of the composite fiber filaments (E) is preferably about 2 to 6.

The interface between the composite fiber filament (E) and the composition containing the thermoplastic resin (C) are adhered. It is also possible that the composition containing the thermoplastic resin (C) penetrates into a part of the composite fiber filament (E) such that the component (D) that constitutes the composite fiber filament (E) is impregnated with the composition.

The largest particle diameter of the graphite (B) in the molding material is preferably 50 to 500 μm. When the largest particle diameter of the graphite (B) in the molding material is 50 μm or more, breakage of the carbon fibers (A) can be prevented more effectively. The particle diameter of the graphite is more preferably 60 μm or more, still more preferably 70 μm or more. On the other hand, when the largest particle diameter of the graphite (B) in the molding material is 500 μm or less, dispersibility in the molded article can be improved and the appearance of the molded article can also be improved. The largest particle diameter of the graphite is more preferably 400 μm or less, still more preferably 300 μm or less. It becomes possible to easily adjust the largest particle diameter of the graphite (B) in the molded article to a value falling within the above-mentioned preferred range by adjusting the largest particle diameter of the graphite (B) in the molding material to a value falling within the above-mentioned preferred range.

The largest particle diameter of the graphite (B) in the molding material can be determined in the same manner as for the determination of the grain largest diameter of the graphite (B) in the molded article.

The method of combining the component (D) with the carbon fibers (A) to produce the composite fiber filament (E)

is not particularly limited. One example of the method is a method comprising: step (I) supplying the component (D) to the carbon fibers (A) and then adhering the component (D) melted at 100 to 300° C. onto the carbon fibers (A); and step (II) of heating the carbon fibers (A) having the component (D) adhered thereon to allow the carbon fibers (A) to be impregnated with the component (D).

In the above-mentioned step (I), the method of supplying the component (D) and then adhering the component (D) onto the carbon fibers (A) is not particularly limited. For example, methods which can be employed for the application of an oil agent, a sizing agent, a matrix resin or the like onto carbon fibers can be employed. Among these methods, dipping or coating is preferably employed.

The term "dipping" as used herein refers to a method in which the component (D) is supplied to a melting bath and the carbon fibers (A) are allowed to pass through the melting bath. It becomes possible to ensure the component (D) to be adhered onto the carbon fibers (A) by immersing the carbon fibers (A) in the melting bath of the component (D). The term "coating" as used herein refers to a method in which the component (D) is applied onto the carbon fibers (A) with a coating means such as a reverse roll, a normally rotating roll, a kiss roll, a spray and a curtain. A reverse roll, a normally rotating roll and a kiss roll refer to methods of applying the component (D) that is melted with a pump is supplied to a roll to apply the molten component (D) onto the carbon fibers (A). A reverse roll refers to a method in which two rolls rotate in directions opposite to each other to apply the molten component (D) onto the rolls. A normally rotating roll refers to a method in which two rolls rotate in the same direction to apply the molten component (D) onto the rolls. In general, in a reverse roll and a normally rotating roll, a method in which an additional roll is provided with the carbon fibers (A) interposed between the roll and the above-mentioned roll to ensure the application of the component (D). A kiss roll refers to a method in which the component (D) can be applied merely by bringing the carbon fibers (A) into contact with a roll. Therefore, the kiss roll is preferably employed when the component (D) has a relatively low viscosity. In any one of these roll methods, it becomes possible to apply a predetermined amount of the component (D) per unit fiber length by applying a predetermined amount of the heat-melted component (D) onto a roll and running the roll while allowing the roll to be in contact with the carbon fibers (A). A spray refers to a method utilizing the principle of atomization, wherein the molten component (D) is atomized in the form of mists onto the carbon fibers (A). A curtain refers to a method in which the molten component (D) is dropped naturally through small holes or is overflowed from a melting vessel to apply the component (D) onto the carbon fibers (A). In these methods, the amount to be applied can be controlled easily and therefore the loss of the component (D) can be minimized.

The melting temperature (i.e., the temperature in the melting bath) to be employed in the supply of the component (D) is preferably 100 to 300° C. When the melting temperature is 100° C. or higher, the viscosity of the component (D) can be maintained at a proper value and, therefore, the non-uniformity of application of the component (D) can be prevented. The melting temperature is more preferably 150° C. or higher. On the other hand, when the melting temperature is 300° C. or lower, the thermal decomposition of the component (D) can be prevented even if the production is carried out for a long period. The melting temperature is more preferably 250° C. or lower. It becomes possible to supply the component (D) stably by bringing the component (D) into contact with the carbon fibers (A) while keeping the component (D) in a molten state at 100 to 300° C.

Next, the step of heating the carbon fibers (A) having the component (D) adhered thereon, which is produced in step (I), to penetrate the component (D) into the carbon fibers (A) (step (II)) will be described. Specifically, step (II) is a step of allowing the component (D) to be penetrated into the insides of the carbon fibers (A) by an operation such as an operation of applying a tension to the carbon fibers (A) having the component (D) adhered thereon by a roll or a bar, an operation of repeating the broadening and bundling of the carbon fibers (A) having the component (D) adhered thereon and an operation of applying a pressure or vibrations to the carbon fibers (A) having the component (D) adhered thereon, at a temperature at which the component (D) can be melted. A more specific example of the method is a method in which the broadening, bundling or the like is carried out while passing the carbon fibers (A) through multiple rolls or bars to become in contact with the surface of the multiple rolls or bars. Particularly, a method using a squeeze tip, a squeeze roll, a roll press or a double-belt press is preferably employed. A squeeze tip refers to a tip of which the diameter becomes larger toward the running direction, and can scrape the excessively adhered component (D) while bundling the carbon fibers (A) and, at the same time, can promote the penetration of the component (D) while bundling the carbon fibers (A). A squeeze roll refers to a roller which, when a tension is applied to the carbon fibers (A) by the roller, can scrape the excessively adhered component (D) and, at the same time, can promote the penetration of the component (D). A roll press refers to a device whereby it becomes possible to remove the carbon fibers (A) continuously by the action of a pressure applied between two rolls and, at the same time, it also becomes possible to promote penetration of the component (D). A double-belt press refers to a device whereby it becomes possible to press the carbon fibers (A) from upward and downward through a belt to promote the penetration of the component (D).

In step (II), it is preferred that the carbon fibers (A) are impregnated with component (D) in an amount of 80 to 100% by weight relative to the amount of the amount of the component (D) to be supplied. The impregnation amount directly affects the yield. Therefore, a larger impregnation amount is preferred from the viewpoint of economic efficiency and productivity. The impregnation amount is more preferably 85 to 100% by weight, still more preferably 90 to 100% by weight, relative to the amount of the component (D) to be supplied. When the impregnation amount is 80% by weight or more, production of a volatile component derived from the component (D) during step (II) can be prevented and formation of voids in the composite fiber filament (E) can also be prevented, in addition to economic efficiency.

In step (II), it is preferred that the highest temperature of the component (D) is 150 to 400° C. When the highest temperature is 150° C. or higher, the component (D) can be melted sufficiently and can be penetrated more effectively. The highest temperature is more preferably 180° C. or higher, still more preferably 200° C. or higher. On the other hand, when the highest temperature is 400° C. or lower, the occurrence of an undesirable side reaction such as a reaction of decomposition of the component (D) can be prevented. The highest temperature is more preferably 380° C. or lower, still more preferably 350° C. or lower.

The heating method to be employed in step (II) is not particularly limited, and specific examples of the heating method include: a method in which a heated chamber is used; and a method in which heating and pressing are carried out simultaneously using a hot roller.

From the viewpoint of preventing the occurrence of an undesirable side reaction such as a reaction of crosslinking of the component (D) and a reaction of decomposition of the component (D), it is preferred to carry out the heating under a non-oxidative atmosphere. The term "non-oxidative atmosphere" as used herein refers to an atmosphere where the oxygen concentration is 5 vol % or less, preferably an atmosphere where the oxygen concentration is 2 vol % or less, still more preferably an oxygen-free atmosphere, i.e., an inert gas (e.g., nitrogen gas, helium gas, argon gas) atmosphere. Particularly from the viewpoint of economic efficiency and easiness of handling, a nitrogen atmosphere is preferred.

In addition, prior to steps (I) and (II), the filament of the carbon fibers (A) may be opened previously. The term "opening" as used herein refers to an operation of opening a bundled carbon fiber filament and, therefore, an effect of further improving the penetration of the component (D) can be expected. This opening operation enables the reduction of the thickness of the reinforcing fiber filament. It is preferred that the opening ratio ($=(b_2/a_2)/(b_1/a_1)$) is adjusted to 2.0 or more, more preferably 2.5 or more, wherein $b_1$ (mm) and $a_1$ (µm), respectively, represent the width and the thickness of a reinforcing fiber filament before the opening operation and $b_2$ (mm) and $a_2$ (µm) respectively represent the width and the thickness of the reinforcing fiber filament after the opening operation.

The method of opening the carbon fiber filament is not particularly limited, and examples of the method that can be employed include a method in which the carbon fiber filament is allowed to pass through a concave-convex roll alternately, a method in which a drum-shaped roll is used, a method in which a varied tension is applied to the carbon fiber filament by the action of axis-direction vibrations, a method in which the tension of the reinforcing fiber filament is varied by two vertically reciprocating friction bodies, and a method in which air is blown against the carbon fiber filament.

Figure 4:
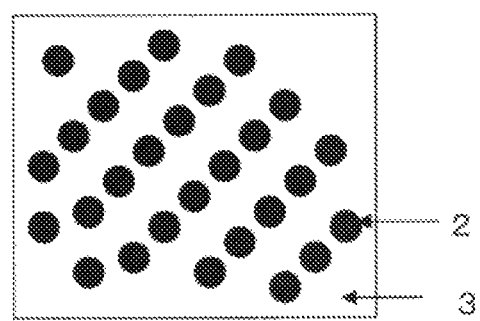
FIG. 4 shows a schematic illustration of one example of the transverse cross section of the composite fiber filament (E).

FIG. 4 shows a schematic illustration of one preferred example of the transverse cross section of the composite fiber filament (E). The term "transverse cross section" as used herein refers to a cross section taken on a plane orthogonal to the axial core direction. In the composite fiber filament (E), the carbon fibers (A) are impregnated with the component (D). The form of the composite fiber filament (E) is as illustrated in FIG. 4 wherein the component (D) 3 is filled between single fibers 2 of the carbon fibers (A), i.e., a form in which single fibers of the carbon fibers (A) are dispersed like islands in a sea composed of the component (D).

The above-mentioned composite fiber filament (E) is covered with a resin composition containing at least the thermoplastic resin (C), thereby producing a molding material.

The molded article and the molding material may additionally contain various types of additives as long as the desired effect is not disturbed. Examples of the additives include a flame retardant agent, an electrical conductivity imparting agent, a nucleating agent, an ultraviolet ray absorber, an antioxidant agent, a vibration damping agent, an antibacterial agent, a moth-repellent agent, a deodorizer, a discoloration-preventing agent, a thermal stabilizer, a mold release agent, an antistatic agent, a plasticizer, a lubricant, a coloring agent, a pigment, a dye, a foaming agent, a foaming modifier and a coupling agent. Two or more of these additives may be used in combination.

The molding material can be molded into a molded article by a technique such as injection molding and press molding. From the viewpoint of handling properties of the molding material, it is preferred that the composite fiber filament (E) and the composition containing the thermoplastic resin (C) are unseparated in an adhered state and keep the above-mentioned form until the initiation of the molding. The composite fiber filament (E) and the composition containing the thermoplastic resin (C) are quite different from each other with respect to a shape (a size, an aspect ratio), a specific gravity and a mass. Therefore, when these components are separated from each other, these components are sieved during the transportation of the material and handling of the material before molding and during transportation of the material in the molding step, sometimes resulting in the fluctuations in mechanical properties of the molded article, the reduction in fluidity of the material to cause clogging in a mold, or the occurrence of blocking during the molding step. When the molding material has a core-sheath structure as illustrated in FIG. 2, the composition containing the thermoplastic resin (C) constrains the composite fiber filament (E) to produce a stronger complex. In addition, from the viewpoint of easiness of handling of the material, the core-sheath structure is preferred.

It is preferred that, when the molding material is molded into a molded article having a thickness of 3 mm, the molded article has an electromagnetic wave shielding property of 10 to 40 dB as measured at 1 GHz. The electromagnetic wave shielding property is more preferably 15 dB or more. The electromagnetic wave shielding property of the molded article can be measured by a KEC method. One example of the method of achieving the above-mentioned electromagnetic wave shielding property is a method in which the weight average fiber length of the carbon fibers (A) present in the molded article is adjusted to a value falling within the above-mentioned preferred range.

The molded article can be produced by molding the molding material. The molding method is not particularly limited, and may be a molding method having excellent productivity such as injection molding, autoclave molding, press molding, filament winding molding and stamping molding. Two or more of these molding methods may be employed in combination. Alternatively, the molding method may be applied to integral molding including insert molding and outsert molding. In addition, reformation processing by heating or an adhesion method having excellent productivity (e.g., thermal fusion bonding, vibration fusion bonding, ultrasonic fusion bonding) may also be utilized. Among these methods, a molding method using a mold is preferred. Particularly when a molding method using an injection molding machine is employed, a stable molded article can be produced continuously. The conditions for the injection molding are not particularly limited. For example, the conditions are preferably as follows: the injection time: 0.5 to 10 seconds, more preferably 2 to 10 seconds; the back pressure: 0.1 to 10 MPa, more preferably 2 to 8 MPa; the hold pressure: 1 to 50 MPa, more preferably 1 to 30 MPa; the pressure holding time: 1 to 20 seconds, more preferably 5 to 20 seconds; the cylinder temperature: 200 to 320° C.; and the mold temperature: 20 to 100° C. The term "cylinder temperature" as used herein refers to a temperature of a part of an injection molding machine at which the molding material is to be melted with heat, and the term "mold temperature" as used herein refers to a temperature of a mold into which the resin is to be injected to form a predetermined shape. The weight average fiber length of the carbon fibers (A) ($L_w$) in the molded article can be adjusted to a value falling within the above-mentioned preferred range by appropriately selecting these conditions, particularly the injection time, the back pressure and the mold temperature.

As the method of producing the molded article, a method in which a molding material which contains the composite fiber filament (E) and the thermoplastic resin (C), but does not contain graphite (B) is dry-blended with pellets each containing the graphite (B) and the thermoplastic resin (C) and the resultant mixture is molded may also be employed, in addition to the method in which the molding material is molded.

The applications of the molded article include: automotive parts/members and exterior panels such as a module (e.g., an instrument panel, a door beam, an undercover, a lamp housing, a pedal housing, a radiator support, a spare tire cover and a front end), a cylinder head cover, a bearing retainer, an intake manifold and a pedal; aircraft-related parts/members and exterior panels such as a gear pod, a winglet, a spoiler, an edge, a ladder, a failing and a rib; machine tools such as a monkey wrench; parts of home/office electrical appliances such as a telephone, a facsimile, a VTR, a copying machine, a television, a microwave oven, an audio equipment, a toiletry product, a laser disc (registered tradename), a refrigerator and an air conditioner; and members for electric/electronic devices such as a housing for a personal computer, a digital camera, a mobile phone or the like, and a keyboard support body that is a member that supports a keyboard in a personal computer. In addition, the molded article is more preferably used as a member for an electric/electronic device because the carbon fibers have electric conductivity and, therefore, the molded article has an electromagnetic wave shielding property to the molded article.

EXAMPLES

Hereinbelow, our molded articles, molding material and methods will be described in detail by way of examples. However, this disclosure is not limited by the examples. First, the methods of evaluating various properties will be described.

(1) Measurement of Weight Average Fiber Length of Carbon Fibers (A) in Molded Article An 80 mm×10 mm×4 mm thick test specimen produced in each of Examples and Comparative Examples was sandwiched between glass plates and then placed on a hot stage set at 200 to 300° C. to heat the test specimen, thereby producing a film in which the carbon fibers (A) were dispersed uniformly. The film having the carbon fibers (A) uniformly dispersed therein was observed with an optical microscope (magnification: 50 to 200 folds). The fiber lengths of randomly selected 1000 carbon fibers (A) were measured, and a weight average fiber length ($L_w$) calculated from the below-shown equation:

Weight average fiber length=$\Sigma(Mi^2 \times Ni)/\Sigma(Mi \times Ni)$

Mi: fiber length (mm)

Ni: number of reinforcing fibers each having fiber length of Mi.

(2) Measurement Specific Gravity of Molded Article

The specific gravity of an 80 mm×10 mm×4 mm thick test specimen produced in each of Examples and Comparative Examples was measured by a liquid immersion method. Distilled water was used as a liquid for the liquid immersion method. The specific gravities of five test specimens were measured, and an average of the measurement values calculated.

(3) Measurement of Thickness of Core Layer in Molded Article

The center part of an 80 mm×10 mm×4 mm thick test specimen produced in each of Examples and Comparative Examples was cut into a piece having a size of 5 mm wide×4 mm thick×20 mm long, which was used as a measurement sample. The cross section of the measurement sample to be measured was aligned with the direction of flow during injection molding. The measurement sample was observed with a three-dimensional measurement X-ray analyzer (TDM10001S model) manufactured by Yamato Material Co., Ltd. to obtain image data of the carbon fibers (A) contained in the molded article. The image data thus obtained was binarized with respect to the images of the carbon fibers (A) and the thermoplastic resin (C) using three-dimensional image processing software TRI series manufactured by RATOC System Engineering Co., Ltd., and then the main orientation direction calculated from the direction of the orientation of the carbon fibers (A). A region in which the main orientation direction of the carbon fibers (A) was 40 degrees or less (wherein the direction of flow of the resin was defined as 90 degrees and the direction perpendicular to the direction of flow of the resin was defined as 0 degree) defined as a core layer, and a region in which the main orientation direction as defined above was more than 40 degrees was defined as a skin layer. The thickness of the core layer was measured, and the ratio of the thickness of the core layer to the thickness of the molded product calculated.

(4) Measurement of Bending Strength of Molded Article

The bending strength of an ISO-type dumbbell-shaped test specimen produced in each of Examples and Comparative Examples was measured in accordance with ISO 178: 2001, wherein the distance from a supporting point was set at 64 mm using a three-point bending test jig (indenter radius: 5 mm) and the measurement carried out under the test condition where the test speed was 2 mm/min. As a test machine, "Instron" (registered tradename) universal testing instrument 5566-model (manufactured by Instron Corporation) was used.

(5) Measurement of Notched Charpy Impact Strength of Molded Article

An 80 mm×10 mm×4 mm thick test specimen produced in each of Examples and Comparative Examples was notched at a notch angle of 45° and a depth of 2 mm in accordance with ISO 2818:2010. The notched Charpy impact strength of the notched test specimen was measured in accordance with ISO179-1:1994 using a hammer at 1.0 J.

(6) Measurement of Heat Conductivity of Molded Article

A 20 mm×20 mm×4 mm thick test specimen was cut out from an ISO-type dumb-bell-shaped test specimen produced in each of Examples and Comparative Examples, the heat conductivity of the test specimens in the thickness direction measured at 80° C. using GH-1S manufactured by ULVAC-RIKO, Inc. Five 20 mm×4 mm×4 mm thick test specimens were cut out from the ISO-type dumbbell-shaped test specimen in the direction perpendicular to the flow of the resin. The five test specimens were arranged side-by-side in a direction perpendicular to the direction of the flow, and the heat conductivity of each of the test specimens in the direction of the flow measured at 80° C. using GH-1S manufactured by ULVAC-RIKO, Inc.

(7) Measurement of Electromagnetic Wave Shielding Property of Molded Article

The electromagnetic wave shielding property of an 80 mm×80 mm×3 mm thick test specimen produced in each of Examples and Comparative Examples was measured by a KEC method at an electric field of 1 GHz.

(8) Measurement of Largest Particle Diameter of Graphite (B) in Molded Article and Molding Material A center part of a 80 mm×10 mm×4 mm thick test specimen produced in each of Examples and Comparative Examples or a cross section of a molding material produced in each of Examples and Comparative Examples was imaged at a magnification of 200 to 2000 folds, then 50 particles were selected in descending order among from particles of the graphite (B) observed on the image, then the particle diameters of the 50 particles measured, and then an average of the particle diameters calculated. When particle of the graphite observed on the image were not circular, the largest diameter of each particle was measured as the particle diameter.

(9) Measurement of Weight Average Fiber Length of Carbon Fibers (A) in Molding Material In molding materials produced in Examples and Comparative Example 1, the lengths of the pellets and the lengths of the carbon fibers (A) were almost the same as each other. Therefore, the lengths of 100 pellets were measured with a slide gauge, then an average of the measured values calculated, and the average deemed as the fiber lengths of the carbon fibers (A). With respect to the molding materials of Comparative Examples 2 and 3, each of the molding materials was sandwiched between glass plates, then heated on a hot stage set at 200 to 300° C., and then dispersed uniformly in a film-like form, and then the weight average fiber length of the carbon fibers (A) calculated in the same manner as mentioned in item (1) above.

Reference Example 1: Production of Carbon Fibers (A-1)

Using a copolymer containing polyacrylonitrile as the main component, homogeneous carbon fibers having a total number of single fibers of 24,000, a single fiber diameter of 7 μm, a mass per unit length of 1.6 g/m, a specific gravity of 1.8 g/cm$^3$, and a surface oxygen concentration [O/C] of 0.12 were produced through the steps of spinning, a burning treatment and a surface oxidation treatment. The strand tensile strength and the strand tensile modulus of the carbon fibers were 4880 MPa and 225 GPa, respectively.

The surface oxygen concentration ratio was determined using carbon fibers, which had been subjected to the surface oxidation treatment, by X-ray photoelectron spectroscopy in the following manner. First, the carbon fiber filament was cut into pieces each having a length of 20 mm, and the pieces were spread and arranged on a copper-made sample support table. The resultant product was used as a measurement sample. The measurement sample was set in a sample chamber in an X-ray photoelectron spectroscopy device, then the inside of the sample chamber was kept at 1×10$^{-8}$ Torr, and then the measurement was carried out using AlKα1 or AlKα2 as an X-ray source. As a value for the correction of a peak which was to be carried out due to occurrence of electrostatic charging during the measurement, the kinetic energy value (K.E.) of the main peak of $C_{1s}$ was set at 1202 eV. The $C_{1s}$ peak area was determined by drawing, as K.E., a linear base line in the range from 1191 to 1205 eV. The $O_{1s}$ peak area was determined by drawing, as K.E., a liner base line of 947 to 959 eV. The surface oxygen concentration [O/C] was calculated as an atom number ratio from the ratio of the $O_{1s}$ peak area to the $C_{1s}$ peak area using a sensitivity correction value inherent to a device. ES-200 model (manufactured by Kokusai Electric Inc.) was used as the X-ray photoelectron spectroscopy device, and the sensitivity correction value employed in this case was 1.74.

Subsequently, as a sizing agent, a sizing treatment solution in which polyglycerol polyglycidyl ether (epoxy equivalent: 140 g/eq) was dissolved in water at a concentration of 2% by weight was prepared. The sizing agent was applied onto the carbon fibers by an immersion method such that the amount of the sizing agent applied onto the carbon fibers became 1.0% by weight, and then the resultant product was dried at 230° C. to produce carbon fibers (A-1). The amount of the sizing agent adhered on the carbon fibers (A-1) was 1.0% by weight.

Reference Example 2: Production of Composite Fiber Filament (E-1)

A coating film of a solution, prepared by melting a component (D-1), i.e., an epoxy resin, by heating, was formed on a roll that was heated to an application temperature of 150° C. For the purpose of forming a coating film having a uniform thickness on a roll, a reverse roll was used. The unbroken carbon fiber filament (A-1) produced in Reference Example 1 was allowed to pass on the roll while contacting the unbroken carbon fiber filament (A-1) with the roll, thereby adhering the epoxy resin (D-1) onto the unbroken carbon fiber filament (A-1). Subsequently, the carbon fiber filament having the epoxy resin adhered thereon was allowed to pass through five pairs of roll presses each having a diameter of 50 mm under a nitrogen atmosphere in a chamber heated to a temperature of 250° C. According to this procedure, the epoxy resin (D-1) penetrated into the carbon fiber filament to produce a composite fiber filament (E-1).

Reference Example 3: Production of Thermoplastic Resin Composition

The following procedures were carried out using a TEX-30α-model twin screw extruder (screw diameter: 30 mm, die diameter: 5 mm, barrel temperature: 290° C., number of revolutions of screw: 150 rpm) (manufactured by JSW). A product produced by the dry-blending of graphite (B) and a thermoplastic resin (C) shown in each of Examples and Comparative Examples at a compounding ratio shown in each of Examples and Comparative Examples, was supplied through a main hopper, and then melt-kneaded while degassing through a vacuum vent provided downstream from the main hopper. The resultant molten resin composition was discharged through a die port. The resultant strand was cooled and then cut with a cutter to produce a pellet-like resin molding material.

Reference Example 4: Production of Cyclic Polyphenylene Sulfide (D-3)

Into a stainless-made autoclave equipped with a stirrer were charged a 48-wt. % aqueous sodium hydrosulfide solution (14.03 g (0.120 mole)), a 48-wt. % aqueous sodium hydroxide solution (12.50 g (0.144 mole)), N-methyl-2-pyrrolidone (NMP) (615.0 g (6.20 moles)) and p-dichlorobenzene (p-DCB) (18.08 g (0.123 mole)). The inside of the reaction vessel was fully purged with nitrogen, and then the reaction vessel hermetically sealed under nitrogen gas.

The temperature of the reaction vessel was raised from room temperature to 200° C. over about 1 hour while stirring at 400 rpm. In this stage, the pressure in the reaction vessel was 0.35 MPa in terms of a gauge pressure. Subsequently, the temperature in the reaction vessel was raised from 200° C. to 270° C. over about 30 minutes. The pressure in the reaction vessel in this stage was 1.05 MPa in terms of a gauge pressure. The reaction vessel was retained at 270° C. for 1 hour and then cooled rapidly to a temperature of around room temperature, and then the content material collected from the reaction vessel.

The content material thus produced was analyzed by employing gas chromatography and high performance liquid chromatography. As a result, we found that the ratio of consumption of the monomer p-DCB was 93% and the ratio of production of cyclic polyphenylene sulfide under the assumption that all of sulfur components in the reaction mixture were converted into cyclic polyphenylene sulfide was 18.5%.

The content material (500 g) was diluted with ion-exchanged water (about 1500 g), and the resultant solution was filtrated through a glass filter having an average mesh size of 10 to 16 μm. A procedure of dispersing the filter-on component in ion-exchanged water (about 300 g), then stirring the resultant solution at 70° C. for 30 minutes and then filtrating the solution in the same manner as mentioned above was repeated three times in total, thereby producing a white solid material. The solid material was dried in vacuo overnight to produce a dried solid material.

The solid material thus produced was placed in a cylindrical paper filter, and then subjected to Soxhlet extraction for about 5 hours using chloroform as a solvent to separate a low-molecular-weight component from the solid material.

A solid material remaining on the cylindrical paper filter after the extraction procedure was dried in vacuo at 70° C. overnight to produce an off-white solid material (about 6.98 g). As the result of the analysis, we found, from absorption spectra in infrared spectrometry, that the product was a compound having a phenylene sulfide structure and had a weight average molecular weight of 6,300.

The solvent was removed from the extract solution obtained by the chloroform extraction procedure, and then chloroform (about 5 g) was added to the resultant product to prepare a slurry. The slurry was added dropwisely into methanol (about 300 g) while stirring to produce a precipitate. The precipitate was collected by filtration, and then dried in vacuo at 70° C. for 5 hours to produce a white powder (1.19 g). We confirmed from the absorption spectra in infrared spectrometry that the white powder was a compound composed of a phenylene sulfide unit. We also found from the mass spectrometry (device: M-1200H, manufactured by Hitachi, Ltd.) of a component produced by the component resolution by high performance liquid chromatography and from the information on molecular weight obtained by MALDI-TOF-MS that the white powder was a compound that contained about 99% by weight of a cyclic compound containing a p-phenylene sulfide unit as the main constituent unit and also contained 4 to 13 repeating units. As the result of a GPC measurement, we found that the cyclic polyphenylene sulfide was completely dissolved in 1-chloronaphthalene at room temperature and had a weight average molecular weight of 900.

In the GPC measurement, 1-chloronaphthalene was used as the solvent, the measurement was carried out at a column temperature of 210° C. and a flow rate of 1.0 mL/min, and the molecular weight was calculated in terms of polystyrene that was a standard.

The raw materials used in Examples and Comparative Examples are as follows:
(B-1) Graphite: scaly graphite CFW-50A (manufactured by Chuetsu Graphite Works Co., Ltd.)
(C-1) A thermoplastic resin: a polycarbonate resin ("Panlite" (registered tradename) L-1225L, manufactured by Teijin Chemicals Ltd.)
(C-2) A thermoplastic resin: a polyphenylene sulfide resin ("Torelina" (registered tradename) M2888, manufactured by Toray Industries, Inc.)
(D-1) An epoxy resin: a solid bisphenol A-type epoxy resin ("jER" (registered tradename) 1004AF, manufactured by Mitsubishi Chemical Corporation, softening point: 97° C.)
(D-2) A terpene resin: a terpene phenol copolymer (YS Polyster G150 (tradename), manufactured by Yasuhara Chemical Co., Ltd., softening point: 150° C.)
(D-3) A cyclic polyarylene sulfide: a cyclic polyphenylene sulfide which was produced in accordance with Reference Example 4 (softening point: 230° C.)

Example 1

The composite fiber filament (E-1) produced by impregnating the carbon fibers (A-1) with the epoxy resin (D-1) in accordance with Reference Example 2, was allowed to pass through a coating die for electric wire coating use which was placed at the tip of a TEX-30α-model twin screw extruder (screw diameter: 30 mm, L/D=32) (manufactured by Japan Steel Works, LTD.). Separately, the thermoplastic resin composition pellets comprising the graphite (B-1) and the thermoplastic resin (C-1) and produced in accordance with Reference Example 3, were supplied through a main hopper of the TEX-30α-type twin screw extruder and then melt-kneaded. The molten product was discharged in a molten state into a die and arranged continuously to coat the periphery of the composite fiber filament (E-1). The amount of the resin composition to be disgorged was controlled such that the compounding amounts of the carbon fibers (A), the graphite (B), the thermoplastic resin (C) and the epoxy resin (D) relative to the total amount, i.e., 100 parts by weight, of the carbon fibers (A), the graphite (B) and the thermoplastic resin (C) became as shown in Table 1. The unbroken molded article thus produced was cooled, and then cut with a cutter to produce a long-fiber-pellet-like resin molding material having a length of 7 mm.

The long-fiber-pellet-like molding material thus produced was subjected to injection molding using a SE75DUZ-C250-model injection molding machine (manufactured by Sumitomo Heavy Industries, Ltd.) under the following conditions: an injection time: 10 seconds, a back pressure: 10 MPa, a pressure holding time: 10 seconds, a cylinder temperature: 300° C. and a mold temperature: 100° C. In this manner, an ISO-type tensile dumbbell-shaped test specimen, an 80 mm×80 mm×3 mm thick test specimen and an 80 mm×10 mm×4 mm thick test specimen (a molded article) were produced. The term "cylinder temperature" as used herein refers to a temperature of a part of an injection molding machine at which the molding material is to be melted with heat, and the term "mold temperature" as used herein refers to a temperature of a mold into which the resin is to be injected to form a predetermined shape. The test specimen (a molded article) thus produced was allowed to leave for 24 hours in a constant temperature and constant humidity chamber that was conditioned at a temperature of 23° C. and at 50% RH, and was then evaluated by the above-mentioned methods. The results of the evaluations are shown in Table 1.

Examples 2 to 6

The same procedure as in Example 1 was carried out, except that the compounding amounts of the components were changed to those shown in Table 1. In this manner, molded articles were produced and were then evaluated. The results of the evaluations are shown in Table 1.

Example 7

The same procedure as in Example 2 was carried out, except that the component (C-1) was changed to a component (C-2) and the cylinder temperature and the mold temperature to be employed in the injection molding were changed to 320° C. and 150° C., respectively. In this manner, a molded article was produced and then evaluated. The results of the evaluations are shown in Table 1.

Example 8

The same procedure as in Example 2 was carried out, except that the component (D-1) was changed to a component (D-2). In this manner, a molded article was produced and then evaluated. The results of the evaluations are shown in Table 1.

Example 9

The same procedure as in Example 2 was carried out, except that the component (D-1) was changed to a component (D-3). In this manner, a molded article was produced and then evaluated. The results of the evaluations are shown in Table 1.

Comparative Examples 1, 5, 6

The same procedure as in Example 1 was carried out, except that the compounding amounts of the components were changed to those shown in Table 1. In this manner, molded articles were produced and then evaluated. The results of the evaluations are shown in Table 2.

Comparative Examples 2 to 4

The following procedures were carried out using a TEX-30α-model twin screw extruder (screw diameter: 30 mm, die diameter: 5 mm, barrel temperature: 290° C., number of revolutions of screw: 150 rpm) (manufactured by JSW). A product produced by the dry-blending of carbon fibers (A-1), graphite (B-1) and a polycarbonate resin (C-1) at a compounding ratio shown in Table 1, was supplied through a main hopper. The molten resin composition was discharged through a die port while degassing through a vacuum vent provided downstream from the main hopper. The resultant strand was cooled, and then cut with a cutter to produce a pellet-like resin molding material. Molded articles were produced, respectively, using the pellet-like resin molding materials in the same manner as in Example 1, and then evaluated. The results of the evaluations are shown in Table 2.

TABLE 1

|  | Items |  | Examples 1 | 2 | 3 | 4 | 5 | 6 | 7 | 8 | 9 |
|---|---|---|---|---|---|---|---|---|---|---|---|
| (A) Carbon fibers | (A-1) Carbon fibers | part(s) by weight | 10 | 10 | 10 | 10 | 5 | 20 | 10 | 10 | 10 |
| (B) Graphite | (B-1) Scaly graphite | part(s) by weight | 5 | 10 | 20 | 30 | 10 | 10 | 10 | 10 | 10 |
| (C) Thermoplastic resin | (C-1) Polycarbonate resin | part(s) by weight | 85 | 80 | 70 | 60 | 85 | 70 | 0 | 80 | 0 |
|  | (C-2) Polyphenylene sulfide resin | part(s) by weight | 0 | 0 | 0 | 0 | 0 | 0 | 80 | 0 | 80 |
| (D) Epoxy resin | (D-1) Epoxy resin | part(s) by weight | 2 | 2 | 2 | 2 | 1 | 4 | 2 | 0 | 0 |
|  | (D-2) Terpene resin | part(s) by weight | 0 | 0 | 0 | 0 | 0 | 0 | 0 | 2 | 0 |
|  | (D-3) Cyclic polyphenylene sulfide | part(s) by weight | 0 | 0 | 0 | 0 | 0 | 0 | 0 | 0 | 2 |
| Results of evaluations of molding material | (A) Weight averate fiber length of carbon fibers | mm | 7 | 7 | 7 | 7 | 7 | 7 | 7 | 7 | 7 |
|  | (B) Largest particle diameter of graphite | μm | 100 | 100 | 100 | 100 | 100 | 100 | 100 | 100 | 100 |
| Result of evaluations of molded article | (A) Weight averate fiber length of carbon fibers | μm | 550 | 550 | 550 | 550 | 600 | 500 | 400 | 550 | 400 |
|  | (B) Largest particle diameter of graphite | μm | 50 | 50 | 50 | 50 | 50 | 50 | 50 | 50 | 50 |
|  | Specific gravity | g/cm$^3$ | 1.25 | 1.3 | 1.35 | 1.4 | 1.3 | 1.35 | 1.4 | 1.3 | 1.4 |
|  | Heat conductivity in thickness direction | W/m · K | 0.6 | 0.7 | 0.9 | 1.5 | 0.6 | 1.1 | 0.6 | 0.6 | 0.6 |
|  | Heat conductivity in flow direction | W/m · K | 1.1 | 1.5 | 2.8 | 4.5 | 1.2 | 1.9 | 1.2 | 1.5 | 1.2 |
|  | Thickness of core layer | % | 30 | 40 | 40 | 40 | 30 | 45 | 40 | 40 | 40 |
|  | Bending strength | MPa | 250 | 260 | 240 | 200 | 200 | 300 | 280 | 250 | 270 |
|  | Notched Charpy impact strength | kJ/m$^2$ | 12 | 12 | 10 | 9 | 10 | 11 | 9 | 11 | 9 |
|  | Electromagnetic wave shielding property | dB | 20 | 20 | 20 | 20 | 15 | 30 | 20 | 20 | 20 |

TABLE 2

|  | Items |  | Comparative Examples ||||||
|---|---|---|---|---|---|---|---|---|
|  |  |  | 1 | 2 | 3 | 4 | 5 | 6 |
| (A) Carbon fibers | (A-1) Carbon fibers | part(s) by weight | 10 | 10 | 10 | 0 | 10 | 40 |
| (B) Graphite | (B-1) Scaly graphite | part(s) by weight | 0 | 0 | 10 | 10 | 50 | 10 |
| (C) Thermplastic resin | (C-1) Polycarbonate resin | part(s) by weight | 90 | 90 | 80 | 90 | 40 | 50 |
|  | (C-2) Polyphenylene sulfide resin | part(s) by weight | 0 | 0 | 0 | 0 | 0 | 0 |
| (D) Epoxy resin | (D-1) Epoxy resin | part(s) by weight | 2 | 0 | 0 | 0 | 2 | 8 |
|  | (D-2) Terpene resin | part(s) by weight | 0 | 0 | 0 | 0 | 0 | 0 |
|  | (D-3) Cyclic polyphenylene sulfide | part(s) by weight | 0 | 0 | 0 | 0 | 0 | 0 |
| Results of evaluations of molding material | (A) Weight averate fiber length of carbon fibers | mm | 7 | 0.3 | 0.3 | — | 7 | 7 |
|  | (B) Largest particle diameter of graphite | μm | — | — | 50 | 100 | 100 | 100 |
| Result of evaluations of molded article | (A) Weight averate fiber length of carbon fibers | μm | 300 | 180 | 180 | — | 450 | 300 |
|  | (B) Largest particle diameter of graphite | μm | — | — | 50 | 100 | 80 | 20 |
|  | Specific gravity | g/cm$^3$ | 1.2 | 1.2 | 1.3 | 1.2 | 1.5 | 1.45 |
|  | Heat conductivity in thickness direction | W/m · K | 0.3 | 0.2 | 0.4 | 0.2 | 1.5 | 1.1 |
|  | Heat conductivity in flow direction | W/m · K | 0.5 | 0.3 | 1.2 | 0.8 | 4.8 | 2.3 |
|  | Thickness of core layer | % | 25 | 15 | 20 | 15 | 30 | 50 |
|  | Bending strength | MPa | 180 | 120 | 100 | 60 | 130 | 140 |
|  | Notched Charpy impact strength | kJ/m$^2$ | 10 | 6 | 6 | 4 | 6 | 6 |
|  | Electromagnetic wave shielding property | dB | 20 | 5 | 5 | 2 | 20 | 40 |

All of the materials of Examples 1 to 9 showed excellent bending strength and thermal conductivities. The material of Comparative Example 1, which did not contain graphite (B), was deteriorated in both heat conductivity and bending strength. The molded articles of Comparative Examples 2 to 3, in each of which the weight average fiber length of the carbon fibers (A) contained therein was short, and the molded article of Comparative Example 4, which did not contain the carbon fibers (A), were deteriorated in a heat conductivity in the thickness direction, bending strength and impact strength. The molded article of Comparative Example 5, which contained the graphite (B) in a large amount, was greatly deteriorated in bending strength and impact strength. The molded article of Comparative Example 6, which contained the carbon fibers (A) in a large amount, was deteriorated in bending strength and impact strength.

INDUSTRIAL APPLICABILITY

The molded article has excellent bending strength and heat conductivity, and therefore can be used in various use applications. The molded article is particularly suitable as various components/internal members such as components, internal members and housings for electric/electronic devices, OA devices, household electrical appliances and automobiles.

The invention claimed is:

1. A fiber reinforced thermoplastic resin molded article comprising (A) carbon fibers, (B) graphite and (C) a thermoplastic resin, wherein the carbon fibers (A), the graphite (B) and the thermoplastic resin (C) are contained in amounts of 1 to 30 parts by weight, 1 to 40 parts by weight and 30 to 98 parts by weight, respectively, relative to 100 parts by weight of the carbon fibers (A), the graphite (B) and the thermoplastic resin (C), weight average fiber length of the carbon fibers (A) is 0.3 to 3 mm and specific gravity of the molded article is 1.1 to 1.9 g/cm$^3$, wherein the molded article comprises a skin layer, a core layer and a skin layer in this order as observed in the thickness direction, and the thickness of the core layer is 20 to 60% relative to the thickness of the molded article.

2. The molded article according to claim 1, wherein heat conductivity as measured in the thickness direction is 0.3 to 5 W/m·K.

3. The molded article according to claim 1, wherein the graphite (B) contains scaly graphite.

4. The molded article according to claim 1, wherein the largest particle diameter of the graphite (B) is 10 to 100 μm.

5. The molded article according to claim 1, further comprising a component (D) selected from a terpene resin, an epoxy resin, a phenolic resin and a cyclic polyarylene sulfide in an amount of 0.1 to 15 parts by weight relative to 100 parts by weight of the components (A) to (C).

* * * * *